(12) United States Patent
Billman et al.

(10) Patent No.: US 7,798,571 B2
(45) Date of Patent: Sep. 21, 2010

(54) CHILD VEHICLE SAFETY SEAT

(75) Inventors: Craig M. Billman, Phoenixville, PA (US); Charles E. Crane, Coatesville, PA (US); Daniel J. Brunick, Birdsboro, PA (US); Michael N. Langmaid, West Chester, PA (US); Matthew A. Morgenstern, West Chester, PA (US); Patrick Nolan, Royersford, PA (US); Damaso Lamos, Reading, PA (US); Patrick W. Laffan, Bridgeport, PA (US); Andrew P. Skrzypek, Chadds Ford, PA (US)

(73) Assignee: Graco Children's Products Inc., Exton, PA (US)

( * ) Notice: Subject to any disclaimer, the term of this patent is extended or adjusted under 35 U.S.C. 154(b) by 931 days.

(21) Appl. No.: 11/416,615

(22) Filed: May 2, 2006

(65) Prior Publication Data

US 2006/0261650 A1    Nov. 23, 2006

Related U.S. Application Data

(60) Provisional application No. 60/676,288, filed on May 2, 2005, provisional application No. 60/676,938, filed on May 3, 2005.

(51) Int. Cl.
*A47C 1/08* (2006.01)
(52) U.S. Cl. .............................. 297/250.1; 297/188.01; 297/188.08; 297/463.1; 297/463.2
(58) Field of Classification Search ............. 297/250.1, 297/256.17, 188.01, 188.08, 188.11, 188.13, 297/188.21, 463.1, 463.2
See application file for complete search history.

(56) References Cited

U.S. PATENT DOCUMENTS

| | | | | | |
|---|---|---|---|---|---|
| 4,652,048 | A | * | 3/1987 | Nazar | 297/188.13 |
| 4,781,413 | A | * | 11/1988 | Shumack, Jr. | 297/252 |
| 5,586,806 | A | * | 12/1996 | Hergott | 297/188.11 |
| 6,227,615 | B1 | * | 5/2001 | Newhouse et al. | 297/188.11 |
| 6,343,837 | B1 | * | 2/2002 | Gage | 297/250.1 |
| 6,431,512 | B1 | * | 8/2002 | Fox et al. | 248/286.1 |
| 7,008,022 | B2 | * | 3/2006 | Cassaday | 297/463.1 |
| 7,029,069 | B2 | * | 4/2006 | Hendren et al. | 297/256.12 |
| 7,246,854 | B2 | * | 7/2007 | Dingman et al. | 297/250.1 |
| 7,370,912 | B2 | * | 5/2008 | Williams et al. | 297/256.11 |
| 7,389,599 | B2 | * | 6/2008 | Hishinuma et al. | 40/375 |
| 2005/0264062 | A1 | * | 12/2005 | Longenecker et al. | 297/250.1 |
| 2007/0001495 | A1 | * | 1/2007 | Boyle et al. | 297/253 |

OTHER PUBLICATIONS

Graco COMFORTSPORT Child Restraint Instruction Manual, dated May 2006.

* cited by examiner

*Primary Examiner*—Laurie K Cranmer
(74) *Attorney, Agent, or Firm*—Lempia Braidwood LLC

(57) ABSTRACT

A car seat has a seat structure with a seating surface and a portion configured to rest on a dedicated seat of a vehicle when installed. The seat structure has a front and a pair of opposed sides. An instruction manual is provided with the car seat. The car seat has a compartment that is configured to receive and retain the instruction manual. The compartment is disposed interior to a part of the seat structure and has an access opening that is accessible when the car seat is installed.

27 Claims, 17 Drawing Sheets

CHILD VEHICLE SAFETY SEAT

RELATED APPLICATION DATA

This patent claims the priority benefit of prior filed U.S. provisional application Ser. No. 60/676,288, which was filed on May 2, 2005, and 60/676,938, which was filed on May 3, 2005, the entire contents of which are each incorporated herein by reference.

BACKGROUND OF THE INVENTION

1. Field of the Disclosure

The present disclosure is generally directed to vehicle safety seats for children, and more particularly to a car seat with a storage receptacle for the car seat's instruction manual, an attachment between a stationary support base and a reclineable seat shell, a safety strap retainer and belt path arrangement, and/or a user friendly recline grip arrangement.

2. Description of Related Art

Safety seat assemblies or car seats are known in the art for use in seating children in vehicles. Nearly all car seats come with an instruction manual that explains how to install the product, secure it in the vehicle, and operate it once installed. Many, but not all, of the known car seats provide a means to retain the manual on some part of the structure. When stored on the seat, it is preferred that the manual be stored in a place that does not result in the manual becoming ejected during a crash. As a result, in most instances the location for storing the instruction manual is positioned on the car seat in a place that is not accessible to the user after the car seat has been installed. For example, many car seats provide a storage location on the back side of the seat or its support base. These types of seats often employ a hook or a shut-off to create an attachment location for a tethered, flexible, plastic sleeve or pocket containing the manual.

The instruction manual in these types of seats can only be put back in place for proper storage while the seat is not installed. This produces a couple of different problems, each occurring because the owner typically reads or should read the manual while installing the car seat in their vehicle. In one instance, the manual might not be put back in place for proper storage after the product is installed, resulting in the manual becoming lost or misplaced. Alternatively, the owner will either read the manual and then properly store it, but only before installing the seat assembly, or will install the care seat, uninstall it, put the manual in its proper place, and then reinstall the car seat. This can result in the car seat not being properly installed or reinstalled because the manual could not be referenced during actual product installation.

In another example, a few manufacturers provide a thin film plastic sheet or pocket on a bottom part of the seat assembly that is somewhat accessible after the car seat is installed. Thus, an owner can read the instructions while installing the seat assembly in their vehicle and then properly store the manual. After installation, the manual can then be inserted and stored in the pocket or under the plastic sheet. However, the instruction manual can be very difficult to remove once it is within a thin plastic pocket or sandwiched between a thin plastic sheet and a surface of the car seat. Also, the plastic film pocket or sheet are typically pretty flimsy and can easily become damaged and torn over time and after several uses. This can result in the manual falling out of the storage receptacle and becoming lost, or in the storage receptacle no longer being of use for storing the manual.

Many types of car seats for toddlers are now required to have a separate safety belt strap or belt known in the art as Lower Anchors and Tethers for Children or LATCH belts. Such LATCH belts, if required, must be provided on the car seat and must be attached to seat anchors in the vehicle. The National Highway and Traffic Safety Association (NHTSA) has issued a number of motor vehicle standards including Federal Motor Vehicle Safety Standard (FMVSS) 225 defining the requirements for such LATCH belts. The LATCH belt must be "permanently" attached to the car seat structure within the meaning of FMVSS 225. In other words, the LATCH belt must remain attached to the seat either without the use of a tool to remove it or upon application of a force less than 45 lbs. applied to the attachment point.

A typical LATCH belt is thus either affixed at a mid-point by a Christmas tree-type fastener directly to the seat structure, or is couple to a tether that is affixed to the seat structure. The first arrangement results in two separately adjustable belt parts extending from the attachment point. The second arrangement results in a LATCH belt loosely tethered to the car seat but not held in place in its proper belt path on the structure. For the direct attachment arrangement, in order to meet the government standard, these types of belts have an adjustment buckle or device on each of the belt parts in order to permit adjusting both ends of the LATCH belt. A user must then properly adjust each belt part separately when installing the product. Additionally, a seat manufacturer must provide and assemble two discrete length adjusters on the LATCH belt. For the tethered attachment arrangement, the user must properly position the LATCH belt on the seat product before installation.

Car seats are also known to have a seat part that can be adjustably reclined between different selectable recline angles. Most of these types of car seats employ a seat support base and a separate shell that defines the seat back and seat bottom seating surfaces for the occupant. The seat angle, i.e., seat recline angle, between the shell and support base in such a car seat can be adjusted by moving the shell relative to the base. In a typical adjustable car seat, the upper part of the base has laterally opposed slots that are oriented generally vertically. The upper seat back of the shell typically has a horizontal metal bar or rod carried on its back side and that is received through these slots. As the seat shell recline is adjusted, the rod remains captured in the slots but is free to slide up and down to permit seat shell movement. Some cars seats might employ a reverse construction putting the rod on the support base and the slots on the back of the seat shell. In any case, the ends of the rod are typically cosmetically capped or closed off within plastic material to loosely hold the rod in position. During a relatively high crash pulse, the rod can bend causing the rod ends to retreat or slip out of the part of the seat in which they are retained or to separate from their plastic end caps. This can result in separation between the seat shell and the support base. This typical construction meets existing NHTSA standards set forth in FMVSS 213.

Most car seats for toddlers employ a reclining feature of some type so that the child can rest more comfortably for sitting or sleeping in the vehicle. The recline feature functions in combination with the seat's harness system, when properly adjusted, to safely hold the child in the seat at all permissible recline angles. A typical car seat with the seat reclining feature has a recline lever near or below a front edge of the seat. The lever has a handle that is depressed or gripped to release or detach a latch mechanism. The parent must typically depress the handle of the lever and then slide the seat to the desired angle while holding the lever in the depressed position until reaching the desired seat angle.

A number of problems exist with the typical reclining car seat. First, the lever is typically beneath the front edge so that the occupant cannot accidentally kick it and release the latch mechanism. Second, the lever is biased to the latched position with a fairly hearty spring or other biasing element. The user must firmly grasp and then hold the handle of the lever in the depressed position. This alone is generally not easy to do because of the biasing force and the position of the handle. Second, the weight of the seat and the child, along with the smooth, hard surface of the conventional plastic lever handle, combine to require a substantial force to keep the lever in the depressed position. The smooth handle does not typically provide much in the form of gripping characteristics. Thus, a parent must apply a significant hand force to keep the lever firmly depressed and within their grasp while adjusting the seat recline. A parent often is seated in the front seat of the vehicle while trying to adjust the seat recline angle, which can make the task even more difficult. Some manufacturers have tried to overcome this deficiency by adding a plastic ledge or rib to the levers in order to add "bite" into a parent's fingers. This solution is not comfortable for the parent, as the grip improvement is achieved by the rib digging into the parent's skin.

Most car seats for toddlers have a harness system as part of the seat. The harness system tension is adjustable to safely and properly secure a toddler in the seat. Most of these types of car seats are adjusted by pulling on a tension strap that extends from a front edge part of the seat between the child's legs. The strap is part of the harness system and is typically fed through an A-lock tensioning device. This type of harness adjustment system is common in toddler seats and is also offered on many products with reclining seats as described above. A problem sometimes occurs when the parent grabs the recline lever handle. The parent often will put their thumb or palm directly on the forward edge of the seat to gain leverage for depressing and holding the handle while adjusting the seat angle. The point at which their thumb or palm falls is often directly on the button or actuator of the A-lock tensioning device that in turn releases the tension strap of the harness. Inadvertent actuation of the A-lock can result in the harness becoming loosened and improperly fitted to the child, and can easily go unnoticed by the parent.

Whether the tensioner or A-lock position is a problem or not, the front edge of the car seat simply does not offer an ergonomically suited, leverage-enhancing resting place for the parent's thumb or palm when adjusting the seat recline. A typical seat construction has a smooth radius, gradually rounded front edge so that a child occupant's legs will be comfortable when extending over the front edge of the seat. This surface profile does not provide an adequately placed, ergonomic, leverage-enhancing surface for a parent's thumb or palm. If the A-lock for the harness system is present, the most comfortable and/or leverage enhancing position for the parent's thumb is often against some part of the A-lock or its surrounding structure. Even this location and surface is typically not adequately placed to provide a comfortable hand position while adjusting the seat shell recline angle. However, the tension in the harness can be inadvertently affected.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed examples of a children's vehicle safety seat assembly or car seat, and features for such a car seat, solve or improve upon one or more of the above-noted and other problems and deficiencies with prior art car seat products. The disclosed car seat features include an easily accessible instruction manual slot provided as a part of the product's structure. The disclosed car seat also includes a LATCH belt retainer arrangement which insures that the product's LATCH belt stays attached to the car seat structure, which has only a single length adjusting device, and which assists in assuring the LATCH belt is properly routed or threaded along the car seat when in use. The disclosed car seat also includes a recline bar attaching the seat shell to the support base that is secured to the seat structure in a manner that improves crash integrity of the attachment. The disclosed car seat also has a seat recline lever and handle construction that is easy to grasp and depress while providing a comfortable, easy to grip handle. The disclosed recline handle construction also has a dedicated surface for a user's thumb or palm while operating the recline lever that both inhibits inadvertently actuating the seat harness tensioning device and creates a leverage surface to assist in operating the recline lever.

As used herein, the term "car seat" is intended to mean a safety seat structure that is generally configured to be placed on a dedicated seat of a vehicle such as a car, truck, minivan, station wagon, or other passenger-type vehicle. The car seat then provides a seat adapted to safely fit and securely hold a child in the vehicle. The short-hand term "car seat" is used herein merely for ease of description and repetition.

Figure 1:
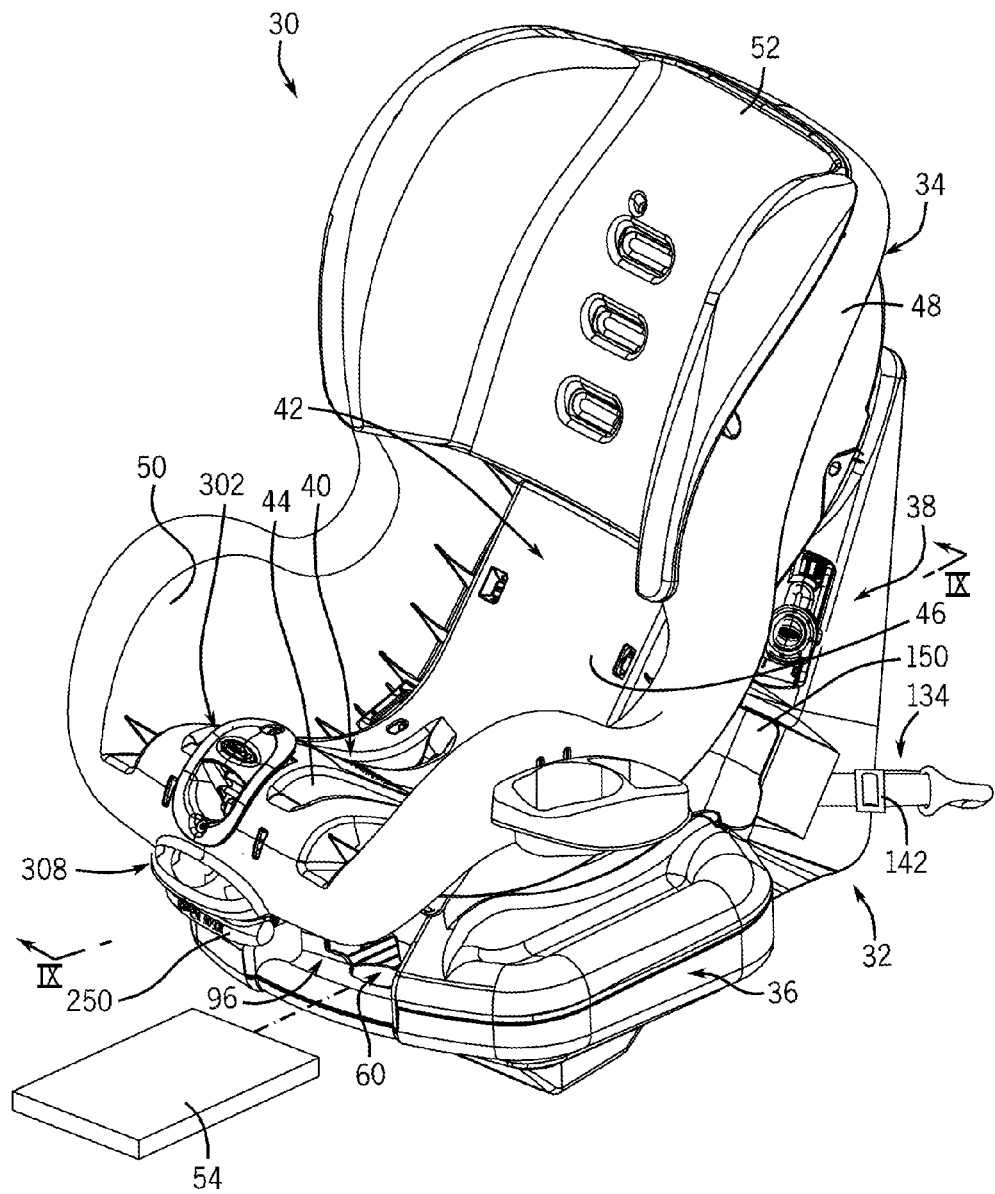
FIG. 1 is a front and top perspective view of a vehicle safety seat assembly or car seat constructed in accordance with the teachings of the present invention.
Figure 2:
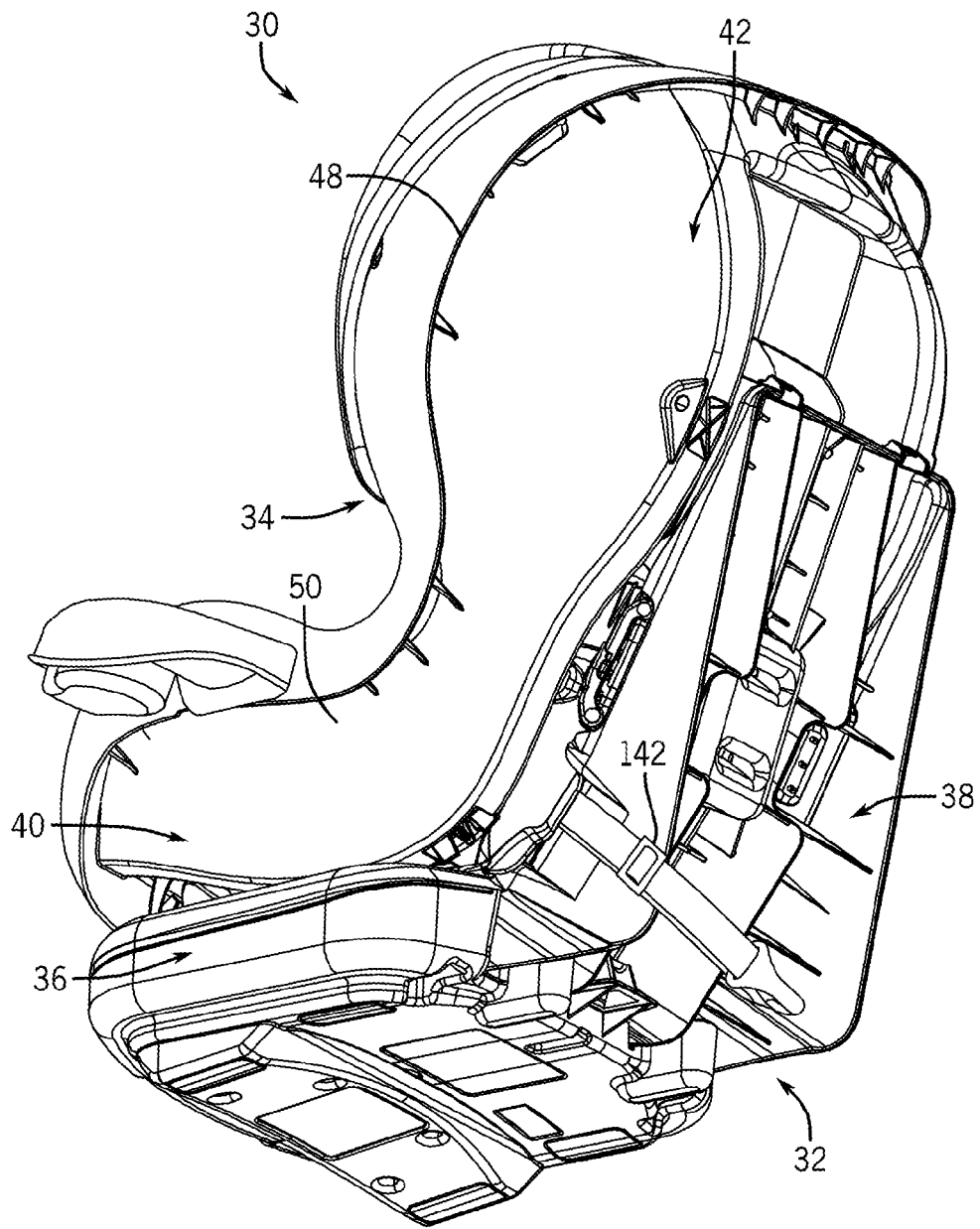
FIG. 2 is a rear and bottom perspective view of the car seat shown in FIG. 1.

Turning now to the drawings, FIGS. 1 and 2 generally show a children's vehicle safety seat assembly or car seat 30 constructed in accordance with the teachings of the present invention. The seat assembly 30 in this example generally has a seat structure that in part defines a seating surface and in part is configured to rest on and be secured to a seat of a vehicle. In the disclosed example, the seat structure has a support base 32 and a seat shell 34 supported on the base. The disclosed car seat shown in FIGS. 1 and 2 employs a number of different aspects of the present invention. Each of these aspects is described separately below. As will be evident to those having ordinary skill in the art, the various aspects can be independently employed in a car seat product instead of each being employed in one car seat as disclosed herein. Furthermore, a car seat product that utilizes one or more of the disclosed aspects of the invention can also differ in construction and configuration from the car seat example shown and described herein and yet fall within the spirit and scope of the present invention.

Figure 3:
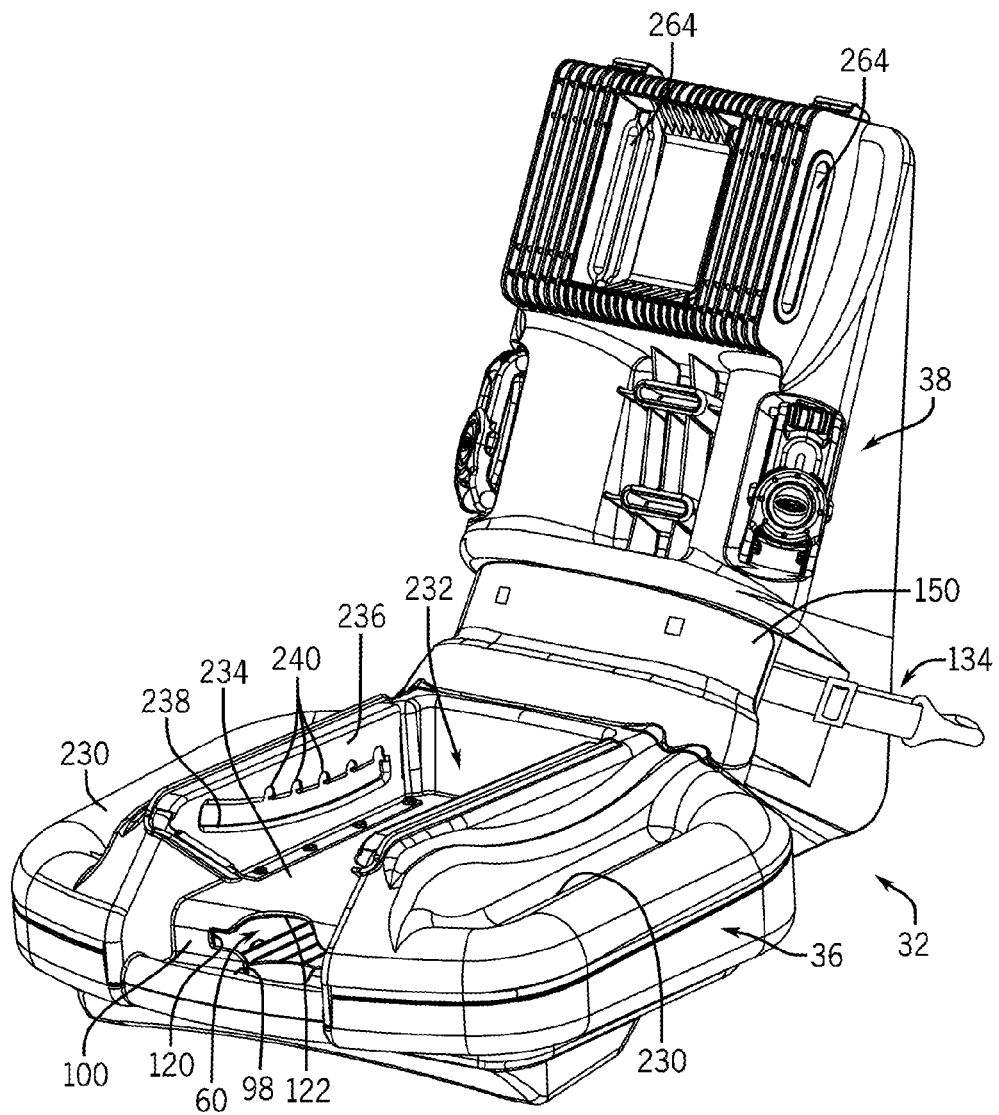
FIG. 3 is a perspective view of only the support base of the car seat as shown in FIG. 1.
Figure 4:
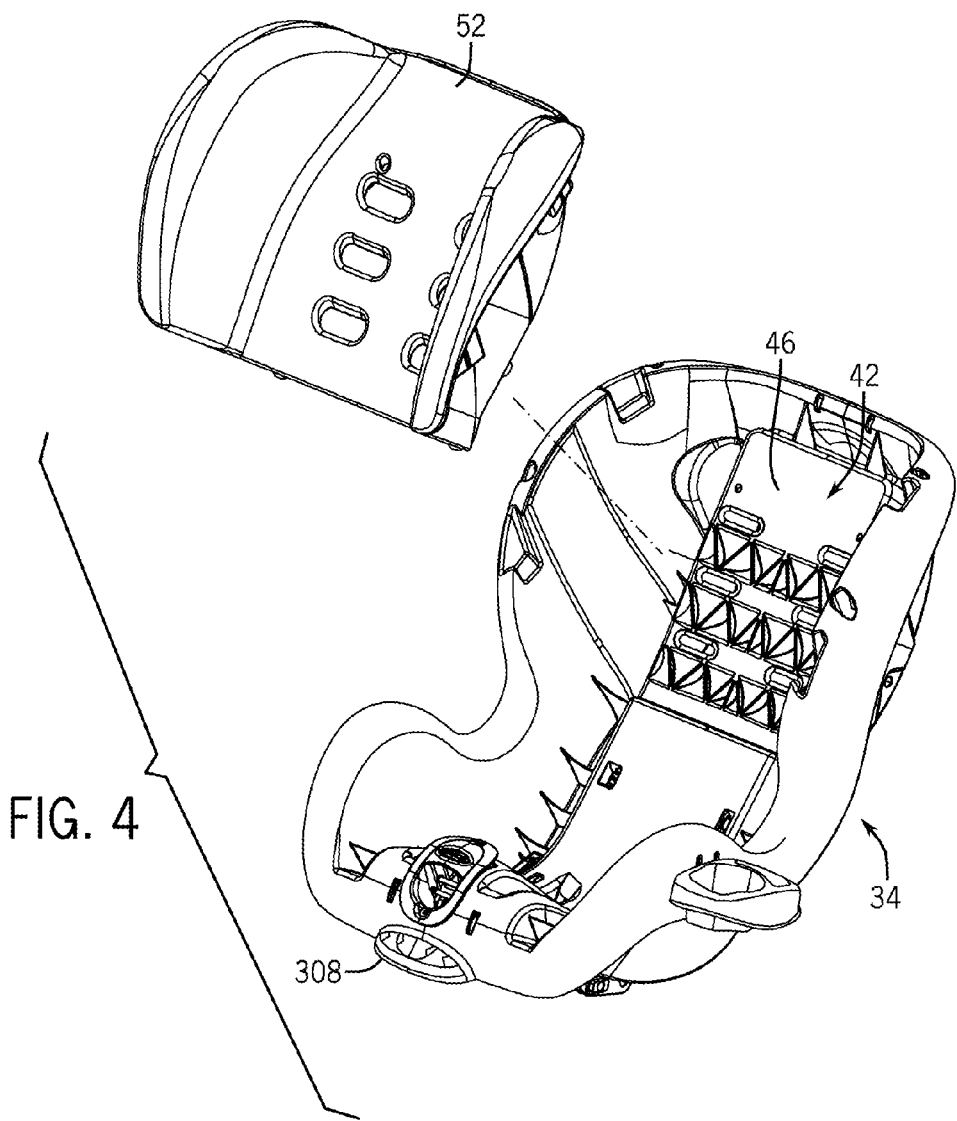
FIG. 4 is an exploded perspective view of only the seat shell of the car seat as shown in FIG. 1.

The support base 32 in this example is shown in FIG. 3 and generally has bottom section 36 and a back section 38. The bottom and back sections 36, 38 are configured to generally follow the contour and orientation of a seat bottom and a seat back, respectively, of a vehicle's dedicated seat. The seat shell 34 in this example is shown in FIG. 4 and generally defines a seat bottom 40 and a seat back 42. The seat bottom 40 has a generally upward facing seat bottom surface 44 and the seat back 42 has a generally forward facing seat back surface 46. These surfaces together form a seating surface of the car seat on which a seat occupant would rest. Though not shown herein, a seat cushion or pad and/or a fabric seat cover typically is attached to the seat shell and covers the seating surface of the shell for aesthetics and, more importantly, additional comfort for the seat occupant.

In this example, the seat shell 34 has a pair of upstanding walls positioned along the side edges of the seating surface. The walls each include an upper barrier wall 48 and a lower barrier wall 50. These walls 48 and 50 assist to confine and retain an occupant within the confines of the car seat. An energy absorbing foam liner 52 is positioned to cover part an upper region of the seat back 42 and to cover inner surfaces of the upper barrier walls 48. The foam liner 52 is a structure that in this example is formed from Expanded Poly Styrene or EPS and matches the contour of the shell. The foam pad 52 can be utilized and attached to the shell for the user's head comfort. An instruction manual 54 for the car seat 30 is generically depicted in FIG. 1 as well.

In one aspect of the present invention shown generally in FIG. 1, the disclosed car seat 30 has an instruction manual slot 60 configured to house and store the owner's manual or instruction manual 54 for the product. In this example, the slot 60 is provided within an interior part of the support base 32 and stores the instruction manual lying flat or in a horizontal orientation. The slot 60 is accessible even when the car seat 30 is properly installed and secured for use on a dedicated seat in a vehicle. As shown in FIGS. 3 and 5-8, the disclosed support base 32 is formed of two primary components including a bottom pan 62 and a top piece 64. In this example, the top piece 64 defines parts of both the bottom and back sections 36, 38 of the base 32. The bottom pan 62 is coupled to and closes off the underside of the bottom section 36 part of the top piece 64. The slot 60 is a pocket or compartment formed between the pan 62 and the underside of the top piece 64.

Figure 5:
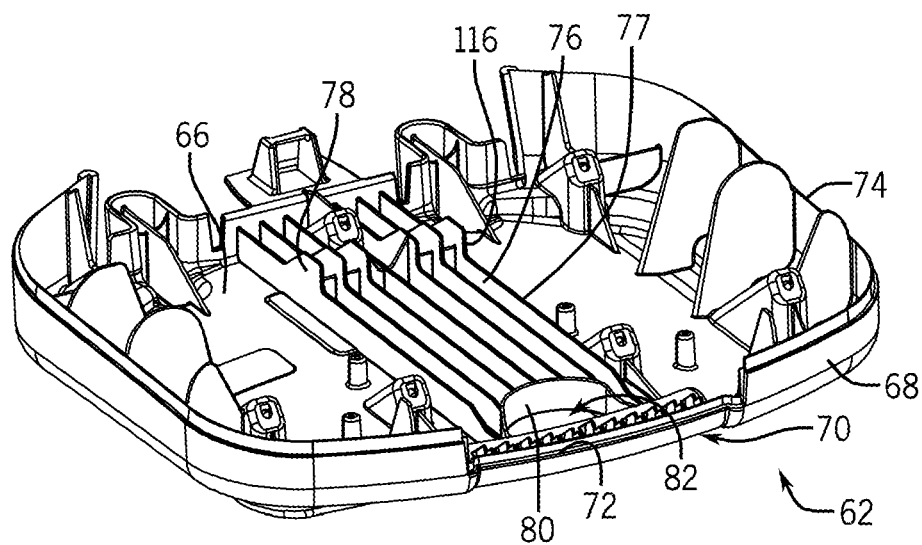
FIG. 5 is a front perspective view of a bottom pan portion of the support base shown in FIG. 3.
Figure 6:
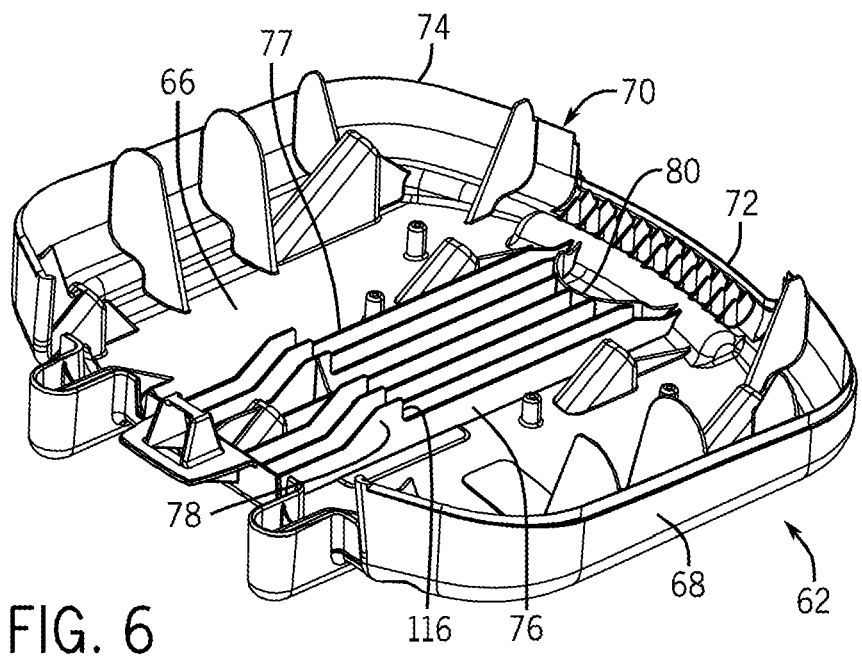
FIG. 6 is a rear perspective view of the bottom pan portion of the support base shown in FIG. 5.

In this example shown in FIGS. 5 and 6, the bottom pan 62 is a molded plastic pan with a bottom panel 66 and an upstanding perimeter wall 68 surrounding the bottom panel. A front end 70 of the bottom pan 62 has a cut-out region 72 in the perimeter wall 68. the perimeter wall terminates at a top edge 74. A plurality of ribs 76 project and extend vertically upward from the bottom panel 62 and extend in a longitudinal direction along the base pan 62. In this example, a substantial portion of the length of each rib 76 terminates at an upper end 77. The upper edges of this portion are all of a consistent matching height.

Most of the ribs 76 in this example include an upward projecting fin or stop 78 positioned toward a back end of the ribs. The stops 78 have a height that terminates at a higher elevation than the elevation of the rib upper ends 77 forward of the stops. A curved wall 80 is rearwardly concave, projects upward from the bottom panel 66, and is positioned contacting forward edges of the ribs 76. Thus, in this example, the ribs 76 terminate at a different forward position defined by their contact point with the curved wall. A finger recess or well 82 is defined above the bottom panel 66, forward of the curved wall 80, and rearward of the cut-out region 72 in the perimeter wall 68 in this example.

Figure 7:
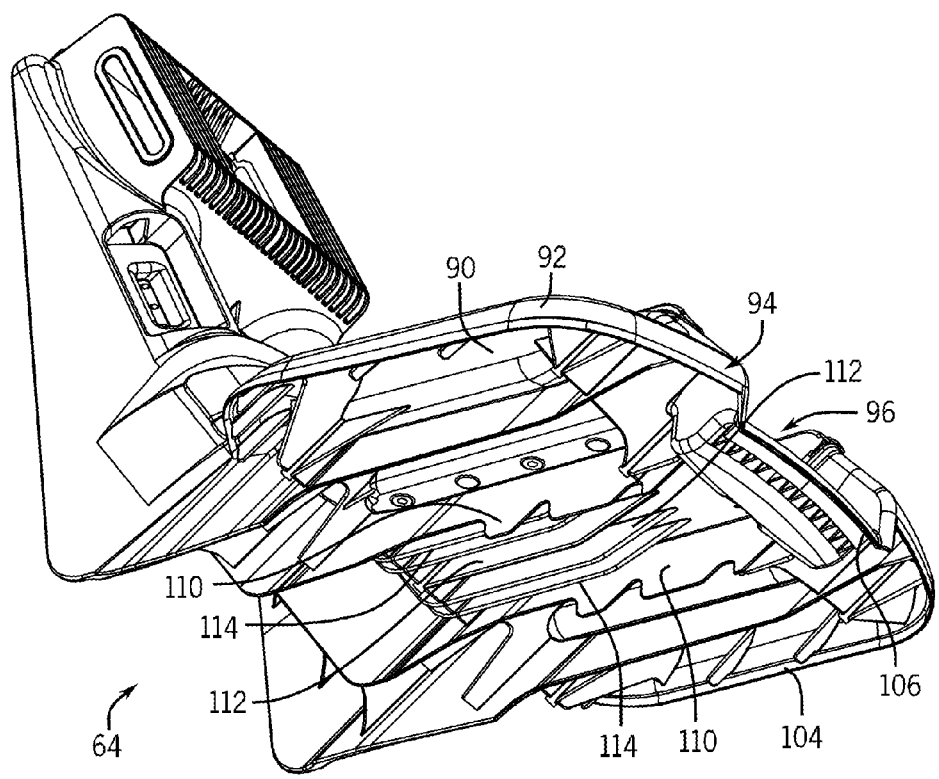
FIG. 7 is a bottom and front perspective view of a top section of the support base shown in FIG. 3.
Figure 8:
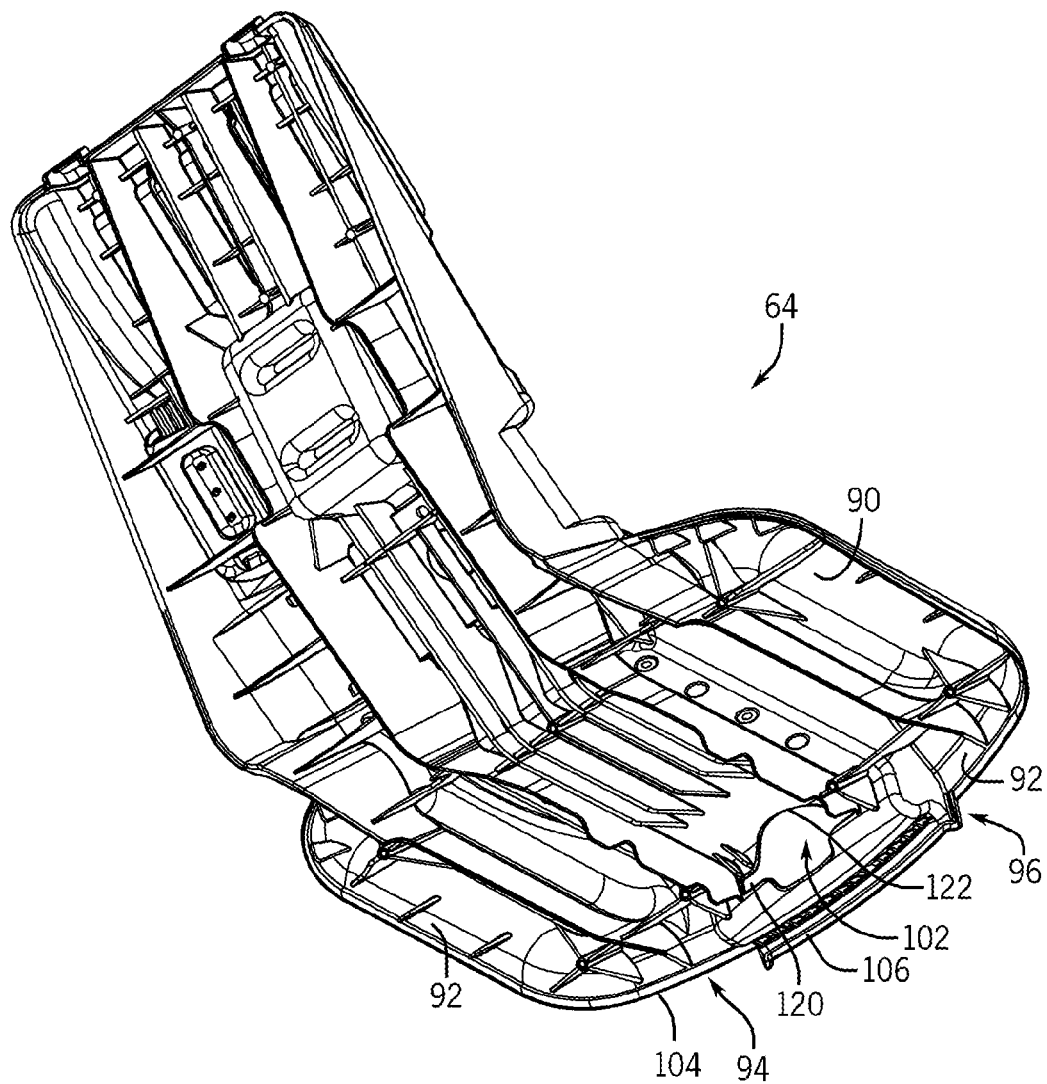
FIG. 8 is a bottom and rear perspective view of the top section of the support base shown in FIG. 7.

The top piece 64 of the support base 32 is depicted in FIGS. 7 and 8. The top piece 64 has a lower panel 90 that defines the underside of the top piece. A perimeter wall 92 projects downward from a perimeter edge of the lower panel 90. A front side 94 of the perimeter wall 92 has a set back region 96 recessed rearward and downward relative to the adjacent lower panel and perimeter wall surfaces. The set back region 96 has an upward facing front ledge 98 located at a lower elevation than the lower panel 90. The set back region 96 also has a forward facing front wall 100 that is set back from the location of the perimeter wall 92. A slot access opening 102 is provided in the front wall 100. A nesting portion 106 of the perimeter wall 92 and the set back region 96, including the ledge 98, projects downward further than a lower edge 104 of the remainder of the perimeter wall 92. When the bottom pan 62 and the top piece 64 are assembled, the nesting portion 106 seats within the cut-out region 72 of the bottom perimeter wall 68. The lower edge 104 of the top piece perimeter wall 92 abuts with the upper edge 74 of the upstanding perimeter wall 66 of the bottom pan 62. The slot access opening 102 in the front wall 104 of the set back region 96 is thus positioned facing the ribs 76 and the finger recess 82 within an interior space between the assembled bottom pan and top piece.

As shown in FIGS. 7 and 8, a pair of opposed and spaced apart boundary walls 110 depend or project downward from the lower panel 90 of the top section 64. A plurality of downward projecting ribs 112 extend from the lower panel 90 and are positioned between the boundary walls 110. Both the boundary walls 110 and the ribs 112 are oriented parallel to the ribs 76 of the bottom pan 62 in this example. The boundary walls 110 project downward sufficient to interleave with the upstanding ribs 76 of the bottom pan 62. Similarly, the upstanding fins or stops 78 project upward sufficient to interleave with the plurality of ribs 112.

In this example, the downward extending ribs 112 terminate at lower edges 114 and are varied or tapered in height. The ribs 112 become taller moving rearward toward the stops 78. When the bottom pan 62 and top section 64 are assembled, a compartment or pocket is formed within the two components. The height of the ribs 76 and the ribs 112 are such that a gap between their respective terminus edges 77 and 114, respectively, is created. The gap height gradually decreases moving rearward toward the stops 78 as the height of the ribs 112 increases. The disclosed pocket or slot 60 is configured to capture an instruction manual therein. Front edges 116 of the stops 78 define a back wall of the compartment. The spaced apart boundary walls 110 define the side boundaries of the compartment. The top edges 77 of the upstanding ribs 76 forward of the front edges 116 of the stops 78 define a bottom surface of the compartment or slot 60. The bottom edges 114 of the downward projecting ribs 112 define a top or ceiling of the compartment.

The height or spacing of the compartment or slot 60 between the bottom edges 114 of the ribs 112 and the top edges 77 of the ribs 76 should be sufficient to easily and adequately receive an instruction manual provided with the car seat 30. The narrower height toward the rear of the slot or compartment 60 near the stops 78 can be designed to snuggly capture part of the instruction manual between the opposed rib edges 77 and 114 to assist in retaining the manual 54 within the slot until it is intended to be removed.

As shown in FIGS. 1 and 8, the slot access opening 102 has a complex contoured configuration. The opening 102 has a pair of laterally and oppositely extending narrow slits 120. The height of the slits 120 is fairly small but should be sufficient to permit a thickness of the instruction manual 54 to pass through the opening 102. A central region 122 of the access opening 102 is positioned between the slits 120 and has a much larger height than that of the slits. The top wall 100 curves rearward and the central region 122 extends slightly into the curved part of the wall. The size, shape, and top curvature of the central region 122 permits clearance sufficient to fit a user's fingers into the slot 60 to retrieve or replace the instruction manual 54. The vertical elevation of the slits 120 is above or higher than that of the top edges 77 of the ribs 76. This creates a lip or barrier below at least the slits 120 of the access opening 102 in the front wall 100 of the compartment above the elevation of the rib top edges 77. The width of the opening across the slits 120 is wide enough to slip the manual through the access opening 102. The width of the opening across only the larger central region 122 is smaller than a width of the manual. To remove the manual, it must be raised and then slid through the slits 120.

As a result of the slot 60 and access opening 102 construction disclosed herein, an instruction manual 54 resting on the ribs 76 within the compartment or slot 60 will not horizontally align with the slot regions 120. If a vehicle were to stop suddenly, the instruction manual 54 stored within the slot 60 would be prevented or inhibited by the lip or barrier from ejecting from the slot through the access opening 102. The finger recess 82 is positioned behind the front wall 100 surrounding the access opening 102. The size and depth of the recess 82 and the size of the central region 122 of the access opening 102 combine to permit a user to easily place their hand within the slot 60 to retrieve the manual 54. Their fingers can reach under the instruction manual 54 into the finger recess 82 to easily grasp and lift the instruction manual, align it with the slits 120, and withdraw it forward out of the instruction manual slot 60.

The disclosed instruction manual slot 60 also is readily visible and apparent to the user. The set back region 96 can assist in drawing the attention of the user to the slot 60. The size of the central region of the access opening can easily reveal to the user the contents of the compartment. Thus, the location and the purpose of the slot 60 will be easily located and easily utilized by a user. They are thus more likely to properly store the manual 54 with the car seat each time it is installed or removed from a vehicle. While providing ready access and visual inspection within the slot 60, the construction of the slot or compartment and the shape of the access opening 102 also render the slot sufficiently robust to properly contain the instruction manual during a crash.

The disclosed example of a readily apparent and easily accessible instruction manual slot or compartment 60 is but one of many possible examples. As will be evident to those having ordinary skill in the art, a readily accessible storage compartment can be provided having a number of configurations and constructions and yet fall within the spirit and scope of the present invention. Variations can include an instruction manual receptacle that can be separately molded and snapped or otherwise fastened to a part of the seat assembly. A large opening could be provided in a front portion of the seat assembly and a separate instruction manual receptacle could be received through the opening and popped or fastened into place. In another example, the instruction manual slot can be provided solely as a part of a single support base component instead of being formed sandwiched between two components as disclosed herein. In yet another example, the instruction manual slot can be provided as a part of the seat shell 34.

In a further example, the instruction manual slot need not be positioned at the front and center portion of the car seat assembly 30 as disclosed herein. Instead, the instruction manual slot could be provided on a corner or on one of the sides of the car seat and yet remain readily accessible. In yet other examples, the instruction manual can be stored in a receptacle or tray in the car seat structure that could be opened or closed by sliding, flipping, or pivoting movement relative to a part of the car seat 30. The surfaces of the compartment need not be formed of ribs or from two different pieces of the car seat. The surfaces could be smooth continuous surfaces and could be formed in one piece or by three or more combined pieces of the seat structure.

The manual could be held in place within the slot using other methods as well. In one example, a plurality of resilient fingers or other biasing elements could be molded into or attached onto a wall of the compartment to press the manual against a surface of the compartment. A door or resilient barrier could be added at the access opening to assist in retaining the manual within the compartment. However, one benefit of the disclosed slot 60 is that it is manufactured solely as part of other car seat components and does not require any piece dedicated to storing the instruction manual 54.

In another aspect of the present invention, a safety LATCH belt retention method and belt path guide are disclosed herein. Government regulations, such as FMVSS 225, require many vehicle safety seats for children to be anchored by a LATCH belt to anchor points within the vehicle. The LATCH belt must be "permanently" attached to the car seat within the meaning of the standard and yet must be adjustable for use in different vehicle configurations. The car seat 30 disclosed herein employs one of several possible examples of a LATCH belt retaining method that permits easy adjustment, can reduce part cost, and can assist in proper threading or routing of the belt if a consumer should be required to reattach the LATCH belt.

Figure 10:
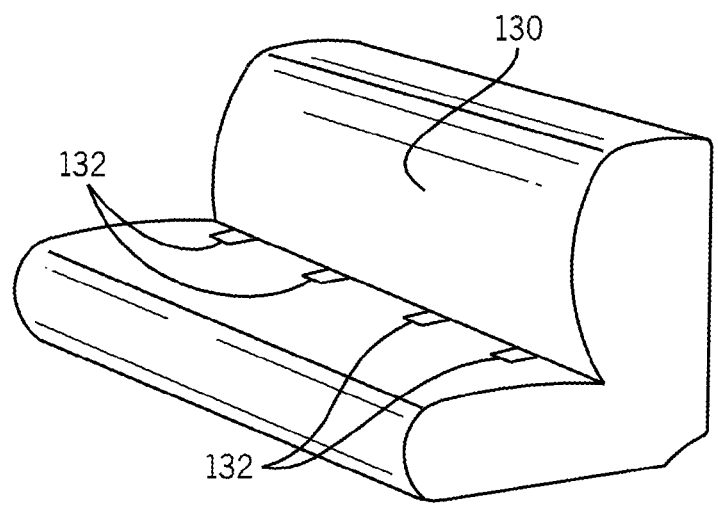
FIG. 10 is a perspective view showing a representative vehicle seat with a plurality of LATCH belt anchor points.
Figure 11:
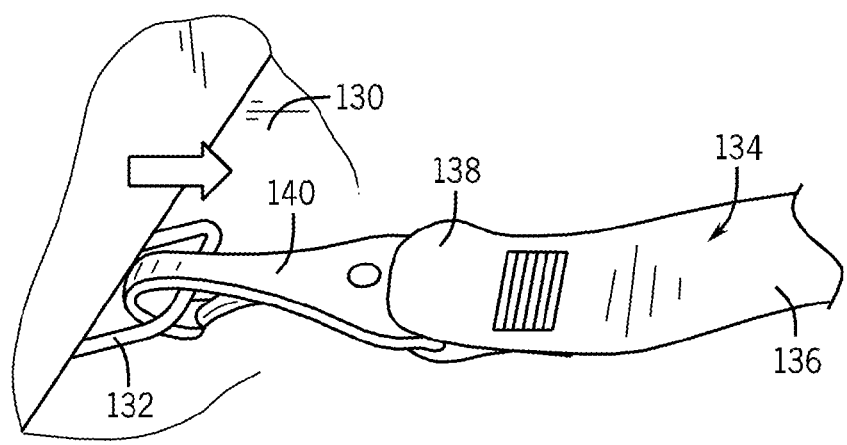
FIG. 11 is a close up view of one of the vehicle anchor points shown in FIG. 10 and with a LATCH belt connector coupled to the anchor.

FIG. 10 shows a typical newer model vehicle seat 130 with car seat lower anchor points 132 provided between the seat back and the seat bottom. Government standards now require vehicle manufacturers to include such anchor points. Government standards also require a variety of different car seats for children to include a LATCH belt 134 to securely hold the car seat in the vehicle seat 130 by attachment to the lower anchor points 132. As shown in FIG. 2, the car seat 30 disclosed herein incorporates such a LATCH belt 134 that, in accordance with FMVSS 225, is considered to be "permanently" attached to the seat structure. The LATCH belt 134 includes a strap portion 136 with a pair of opposed ends 138. A connector or clip 140 is provided on each end. In the disclosed example, the strap 136 requires only a single adjustor 142 and yet can permit adjustment at both ends 138, i.e., over the entire length of the strap 136. This saves part cost and installation complexity in comparison to prior art latching systems. However, two adjusters could optionally be employed, if desired. The prior known LATCH belt systems that employ direct-to-seat structure attachment require adjustment at each end. The prior known systems that employ a tethered attachment can permit belt length adjustment with only one adjuster, but do not provide any belt path or routing indication or assistance for the user. As described below, the disclosed Latch belt arrangements do provide belt path or routing assistance.

Figure 12:
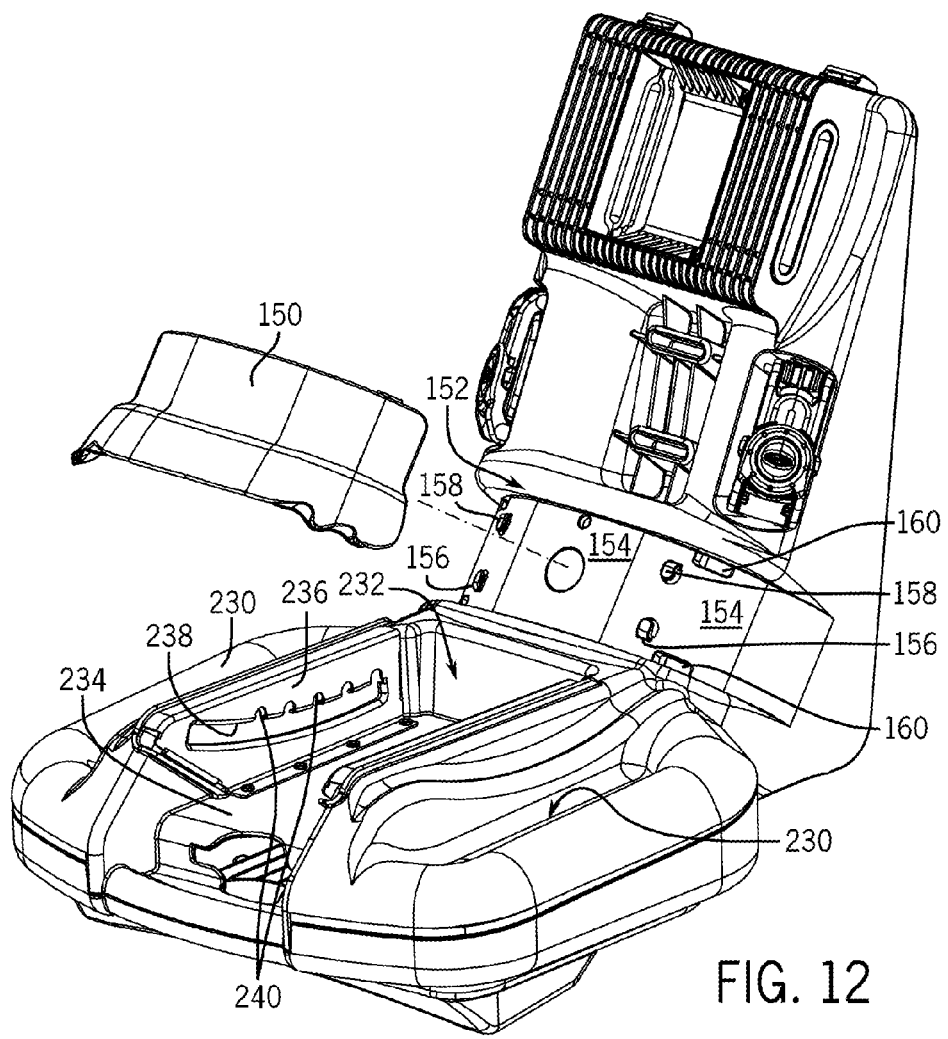
FIG. 12 is a partially exploded view of the support base and a LATCH belt retainer of the car seat as shown in FIG. 1.

FIG. 12 shows an exploded front perspective view of the support base 32. The support base includes a separately attached guide or retainer 150 that attaches to a lower front surface 152 of the back section 38 of the support base. The front surface 152 of the back section 38 has a recessed region 154 near the lower end. The retainer 150 is configured to be received over and closely cover the recessed region 154. In the disclosed example, a plurality of guide tabs 156 project outward in vertically adjacent pairs from the recess region 154. Each tab 156 has a cantilevered lip 158 that extends toward the opposite lip of the other tab 156 in each pair. The lips 158 are configured to overlie and loosely retain the LATCH belt 134 between the pairs of tabs. The tabs 156 act as a LATCH belt guide and define a threaded path for installing the LATCH belt 134. No part of the LATCH belt is secured directly to the front surface 152 of the support base within the recessed region 154 and thus the LATCH belt is free to slide relative to the support base along its length. The tabs 156 laterally capture the LATCH belt to properly locate the belt on the support base 32 and can assist in holding the belt in place until the retainer is installed.

Figure 13:
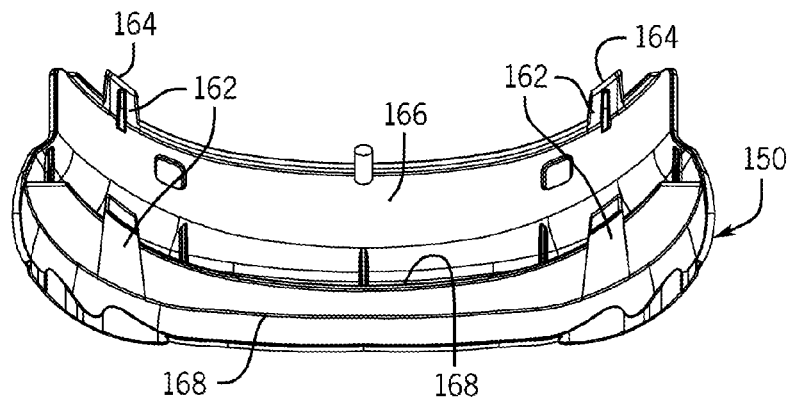
FIG. 13 is a rear view of the LATCH belt retainer shown in FIG. 12.

The retainer 150 is shown in FIGS. 12 and 13 and in this example is constructed to securely snap onto the front surface 152 over the recessed region 154 in this example. A plurality of receptacles or openings 160 are provided within the recess region 154. A rear side of the retainer 150 includes a plurality of attachment prongs or projections 162 that extend rearward from the retainer. Each of the prongs or retainers includes a catch 164 that extends laterally from the prong. Each catch 162 is intended to underlie a surface of the base 32 adjacent the openings 160 once installed. The prongs or projections 162 in this example are designed to flex to permit installation of the retainer and are resilient to spring back allowing the catch to securely hold the retainer 150 in position.

In the disclosed example, the retainer 150 is designed so that it lies spaced a small distance from the front surface 152 within the recessed region 154. The gap or spacing permits the LATCH belt 134 to freely slide longitudinally though captured between the retainer and the recessed region. The spacing in this example is accomplished by the length of the prongs 162, the positioning of the catches 164, the thickness of the material at the openings or receptacles 160, and the height of the tabs 156. A rear side 166 of the retainer 150 also has a plurality of ribs 168 to add strength and rigidity to the part, but that can also have a height to assist in defining the spacing. One or more of these components can each be designed to cooperate and create a desired gap or spacing. The gap between the retainer 150 and the recessed region is small enough in this example so that the ends 138 of the strap 136, including the clips 140 and adjustor 142, cannot fit between the retainer and the recessed region. Thus, these components will prevent the LATCH belt 134 from being pulled completely from between the retainer and the support base, as is intended by the federal standard. The components will also assure that the LATCH belt is properly positioned. In the disclosed example, the retainer 150 can be provided in a different color, such as bright red, to alert a user to its purpose, which can be to alert a user of the proper LATCH belt path.

The intent of the federal standard is to prevent the LATCH belt from easily being removed from the product and to thus highly encourage a user of the product to employ the LATCH belt when installing the child safety seat in a vehicle. In the disclosed example, the LATCH belt is provided with only a single attachment location and, thus, the retainer need not necessarily be intended to be removed and replaced by a consumer. However, the red color of the retainer can still be used to draw the attention of the consumer or user of the product to help encourage the user to utilize the LATCH belt feature for safety purposes.

The LATCH belt retention and path functions can be achieved using other configurations and constructions from that shown in FIGS. 10-13. Variations in the way that the retainer is attached to and fastened to the support base can also be used within the spirit and scope of the present invention. Other retainer configurations can also be employed.

Figure 14:
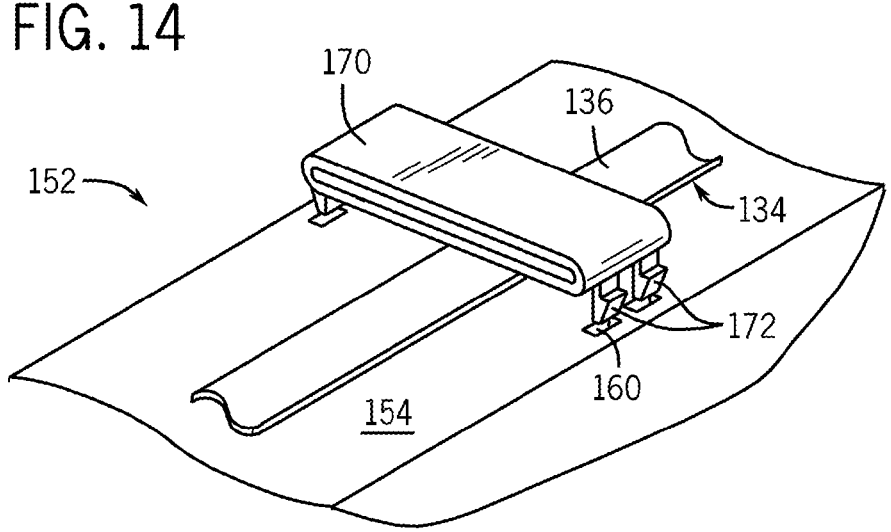
FIGS. 14-17 show perspective views of other alternative examples of a LATCH belt retainer arrangement constructed in accordance with the teachings of the present invention.

For example, FIG. 14 shows a retainer in the form of a small closed loop 170 of material with a plurality of projecting prongs 172. The LATCH belt 134 could be manufactured with the loop 170 as part of the belt structure. The loop is sized so that the strap can freely travel through the loop, but so that he clips and adjustor cannot pass through the loop. Thus, the loop 170 is a permanent part of the LATCH belt in this example. The prongs 172 would attach the loop 170 to the surface 152 of the support base 32 in the same manner that the retainer 150 of the prior example is attached.

Figure 15:
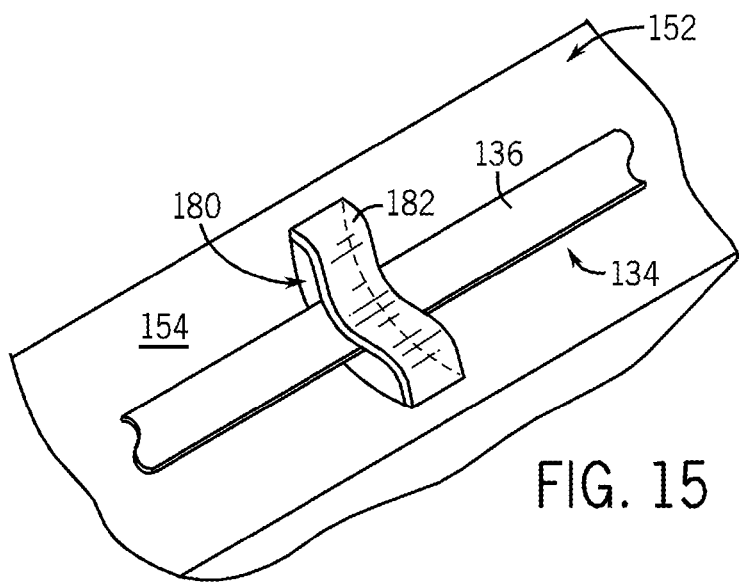

FIG. 15 shows another example that employs a slot 180 defined by a bridge 182 integrally molded in the surface 152 of the support base 32. In this example, the LATCH belt 134 would be sub-assembled while threaded through the slot 180 under the bridge 182. Once completed, the LATCH belt 134 could not be removed from the base 32. The slot is sized so that the connectors and the adjustor cannot pass through the slot. In this example, the LATCH belt 134 could not be moved to another location on the seat structure.

Figure 16:
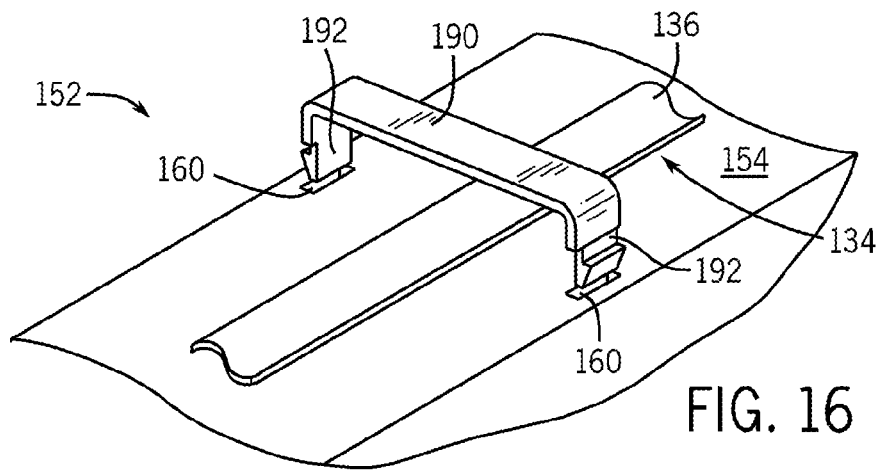

FIG. 16 shows another example that is similar to the retainer 150, but that does not provide an elongate channel across the support base for the belt path. In this example, a narrow width, vertically oriented retainer band 190 has a pair of prongs 192 on its opposite ends. The retainer is C-shaped and creates a narrow space between it and the surface 52 of the support base 32. The prongs 192 snap into openings 160 in the base, as in the prior example of the retainer 150. The LATCH belt is captured between the ends of the band 190 and the band and the surface 152 of the seat structure. Again, the space between the band 190 and the seats structure surface 152 prevents the connectors of the letch belt from slipping through the space.

Figure 17:
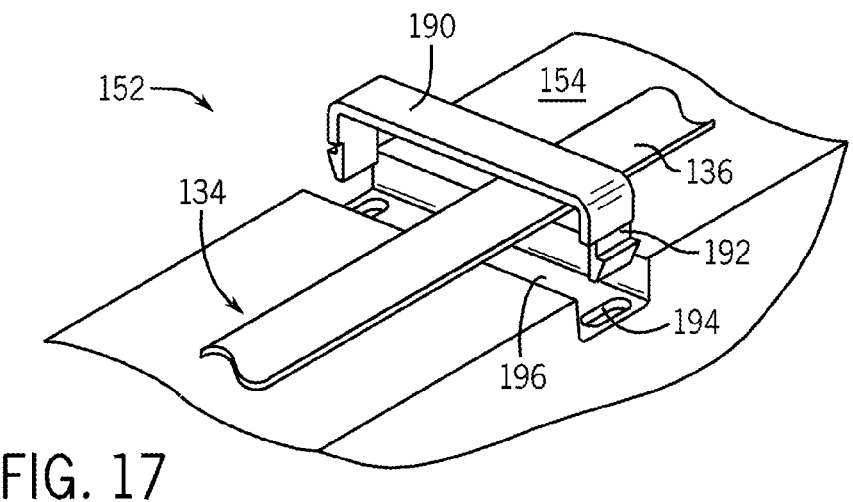
Figure 18:
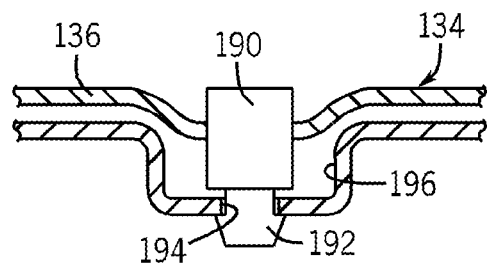
FIG. 18 is an end view of the LATCH belt retainer arrangement shown in FIG. 17.

FIGS. 17 and 18 illustrate a minor variation of the example shown in FIG. 16. In this example, the retainer band 190 is positioned over a vertically oriented groove 196 in the surface 152. As shown in FIG. 18, the LATCH belt 134 would be rerouted into the groove, which could be result in some sliding resistance of the belt over its length, if desired, when installed. In this example, the retainer band 190 lies at least partly below a level of the surface 152 in order to require the strap 136 to be rerouted. The prongs 192 snap into prong openings 194 within the groove 196 in this example.

Figure 19:
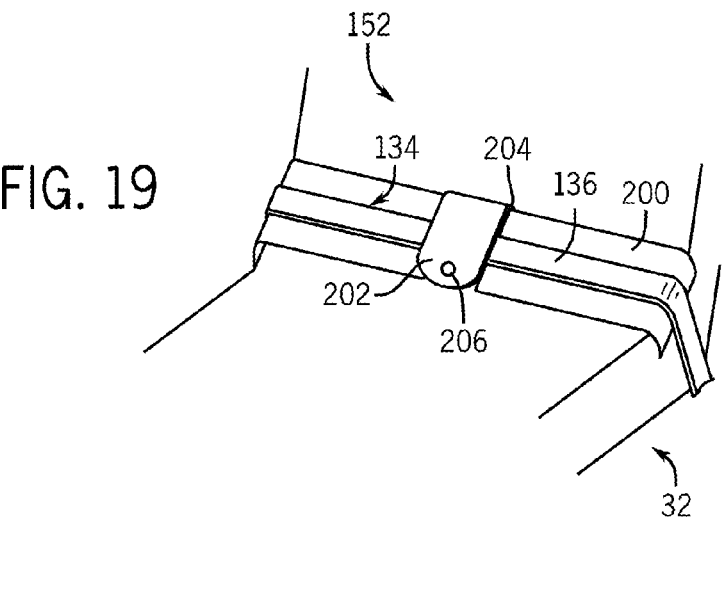
FIG. 19 is a perspective view of yet another example of a LATCH belt retainer arrangement constructed in accordance with the teachings of the present invention.

FIG. 19 shows yet another example of a retainer and belt path indicator arrangement. In this example, the belt path indicator 200 is positioned on the surface 152 of the support base 32 beneath the LATCH belt 134. In this example, a finger 202 extends upward and over the retainer 200 creating a gap between the two parts. The LATCH belt 134 is received between the two parts. The finger 202 can have an end 204 integrally formed as part of the retainer 200 and a free end 206. The free end can be provided with a catch or connector to affix the free end to the retainer when the belt is properly installed. Though not show, the finger can extend vertically upward or downward into a storage receptacle. The extended finger could then form a track along which the belt could slide laterally to be entirely stored in the receptacle of the support base when not in use.

Various other belt path indicator and belt retainer configurations and constructions can also be employed and yet fall within the spirit and scope of the present invention. The above described examples are provided merely as representative examples.

Figure 20:
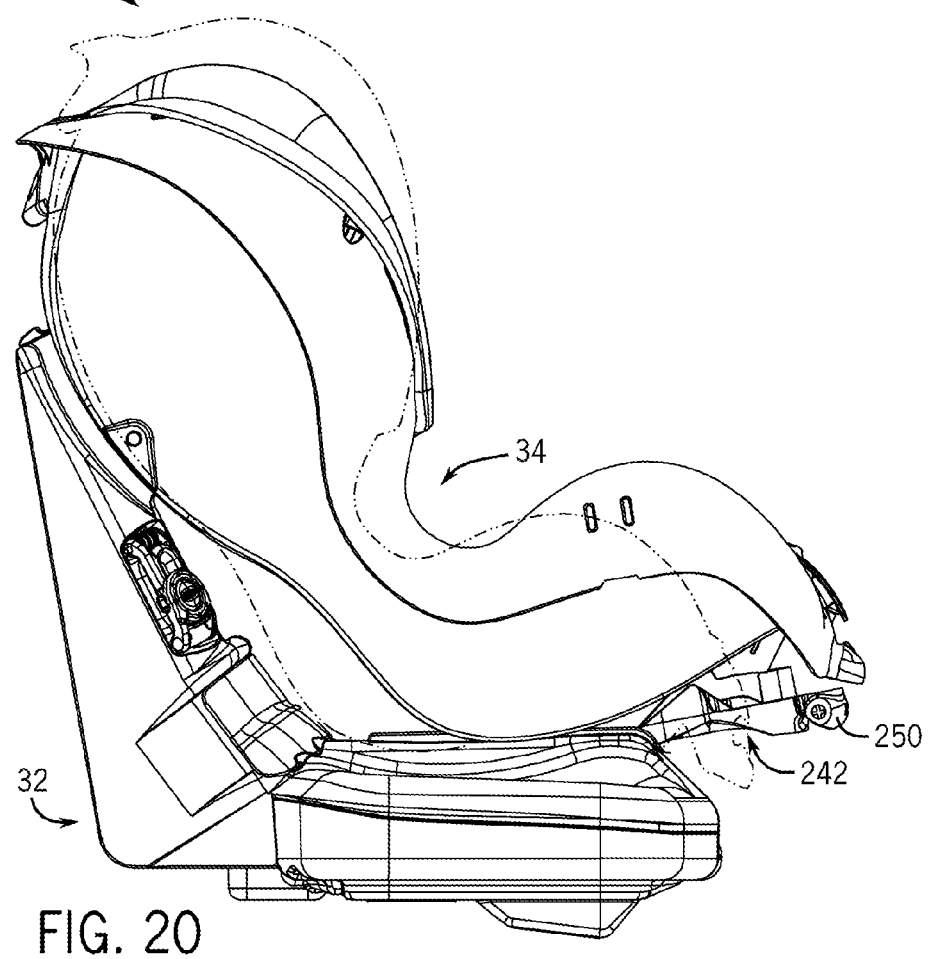
FIG. 20 is a side view of the car seat shown in FIG. 1.
Figure 21:
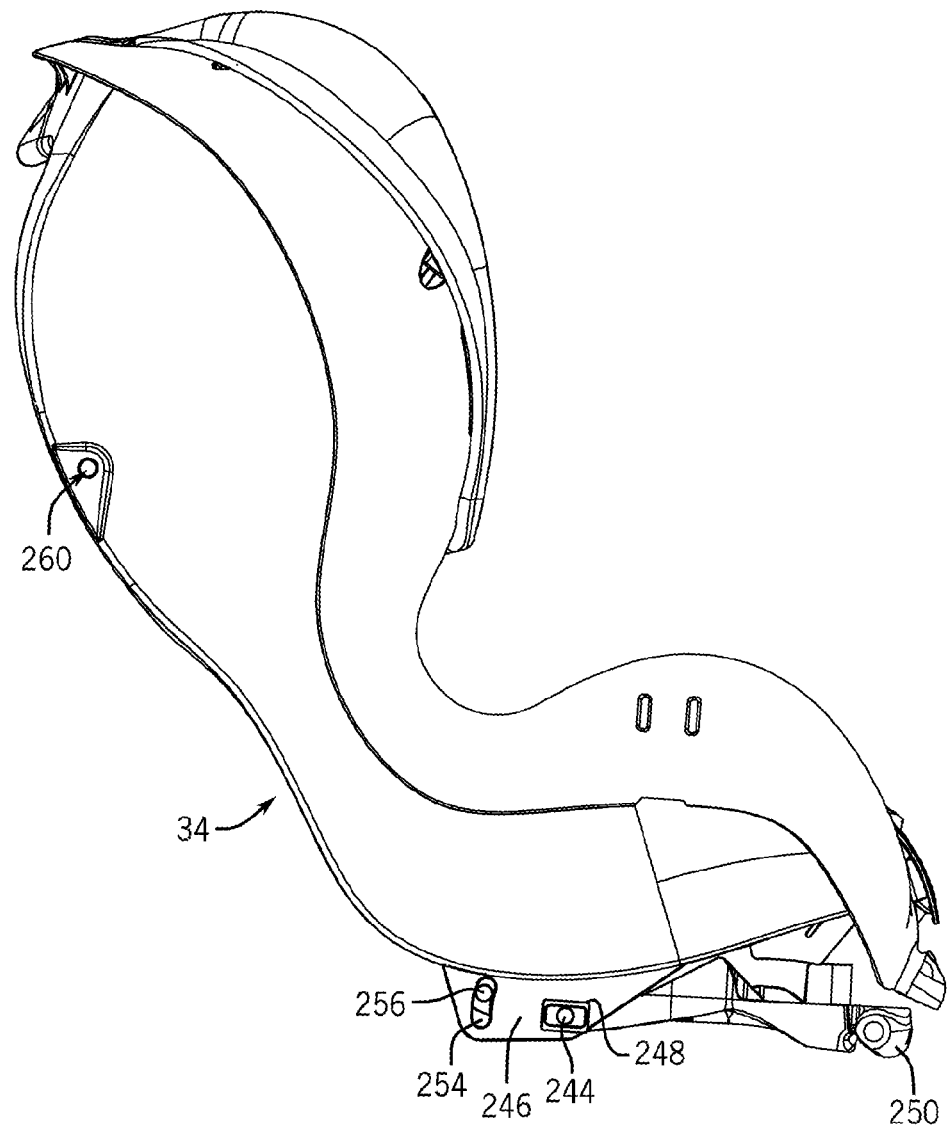
FIG. 21 is a side view showing only the seat shell portions of the car seat as shown in FIG. 20.
Figure 22:
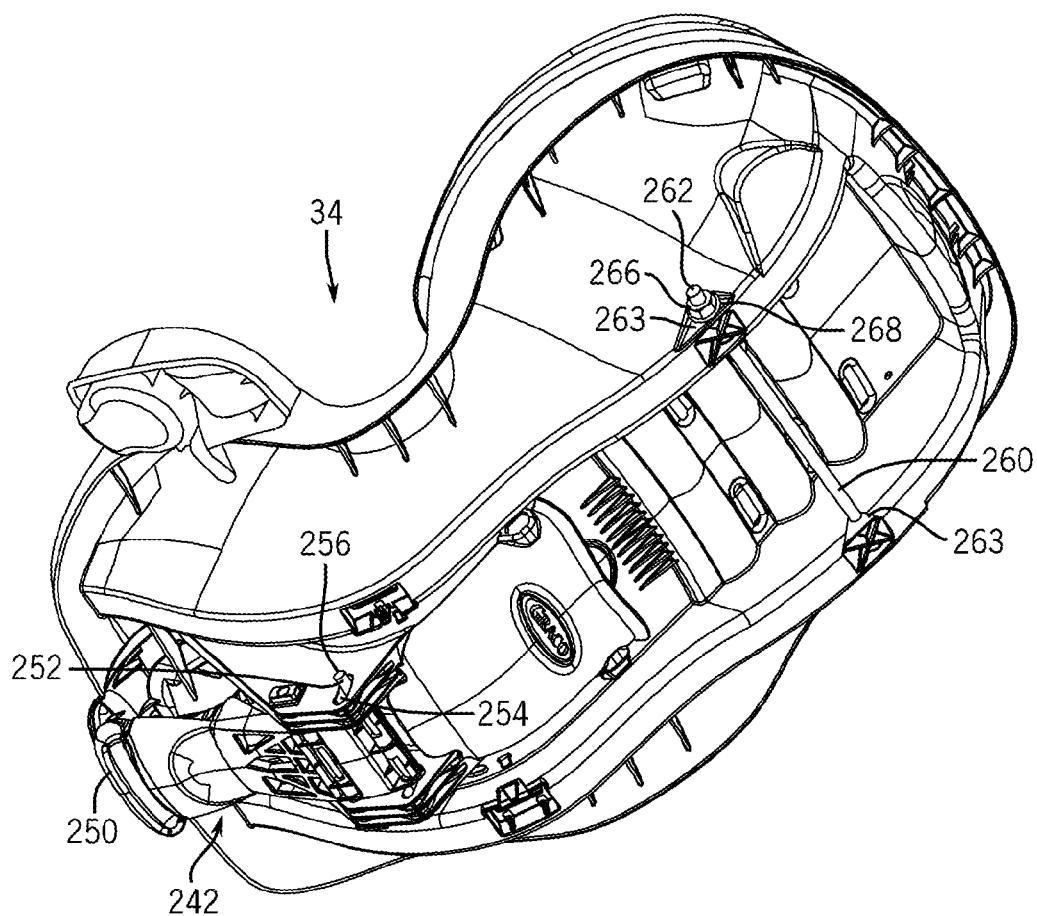
FIG. 22 is a rear and bottom perspective view of the seat shell portions of the car seat and as shown in FIG. 21 and showing one example of a seat back rod and its mechanical engagement device securing the rod to part of the car seat structure.

In another aspect of the present invention, the car seat 30 employs a recline feature. In the disclosed example, the seat recline or angle of incline for the seat shell 34 can be adjusted relative to the support base 32. FIG. 20 shows a representative adjustment range for the seat shell from a fully downward and forward position shown in solid lines to a fully raised and rearward position shown in dashed lines. FIG. 21 is a side view of just the seat shell 34 and its corresponding components and FIG. 22 is a bottom perspective view of the seat shell 34. As previously discussed, FIG. 3 is a top and front perspective view of just the support base 32 and its various components. Both the support base 32 and the seat shell 34 in this example include some of the components that cooperate with one another to provide the recline feature.

As shown in FIGS. 3 and 20-22, the seat recline feature is accomplished by a number of components. An upper side 230 of the support base 32 has a sunken region 232 central located and longitudinally oriented in the base. The sunken region has a top surface 234 facing upward and a pair of laterally opposed sidewalls 235. An adjustment plate 236 is mounted to each of the sidewalls 235 in this example. Each adjustment plate includes a slide track 238 with a plurality of adjustment notches 240. A recline lever 242 has a transversely arranged pivot shaft 244. The pivot shaft 244 is pivotally received through a pair of laterally spaced shaft bores formed in respective mounts 246 that extend downward from the underside of the seat shell 34. The exposed ends 247 of the pivot shaft 244 are journaled within a pair of bearings 248 positioned on the respective outside surfaces of the mounts 246 and permit the recline lever 242 to pivotally move about the pivot shaft. The pivot shaft 244 is axially confined between the spacing of the walls 235, positioned close to the shaft ends 247 within the sunken region.

A handle 250 is formed and configured on the forward end of the recline lever 244. A rear end of the recline lever 242 on the opposite side of the pivot shaft 244 includes a recline latch bar 252 arranged parallel to the pivot shaft. As shown in FIG. 22, the ends 256 of the latch bar 252 extend beyond the extremities of the recline lever, through vertically slotted openings 254 in the respective mounts 246, and outward beyond the mounts. The latch bar 252 is also axially confined between the spacing of the walls 235, again positioned close to the ends 256 within the sunken region. Though not shown herein, the forward end of the recline lever 242 is resiliently biased in a direction so that the handle 250 is biased downward and the latch bar 252 is biased upward as shown in FIGS. 20-22. The biasing element can be a spring or other suitable structure. In the assembled car seat 30, the latch bar ends 256 are captured within the slide tracks 238 and can be aligned with any selected pair of the notches 240 in the plates 236. This is accomplished simply by drawing the handle 250 upward to release the ends of the latch bar 252 from notches in which they currently reside. The seat can then be slid in the desired direction to the desired seat angle. The handle 250 can be released and the ends 252 of the latch bar will be biased upward into the notches 240 with which they are now aligned.

In order to permit seat angle adjustment but retain connection at the upper end of the car seat 30 between the seat back 42 of the seat shell 34 and the back section 38 of the support base 32, a movable connection between the two components is necessary. In the disclosed example, a recline rod 260 is horizontally oriented and mounted to a back side of the seat back 42. Opposed ends 262 of the rod 260 are received through and extend beyond corresponding rod openings formed in projections or mounts 263 extending from the seat back structure. In order to achieve adjustment, the recline rod 260 is captured within a pair of elongate slots 264 as shown in FIG. 3 in the front side of the back section 38 on the support base 32. The slots 264 are generally vertically oriented and permit confined movement of the rod 260 along their length. The rod 260 is free to move along the height of the slots but is retained within the parameters of the slots 264 as is known in the art.

In the disclosed example, the connection of the recline rod 260 to the seat back 42 is a fixed mechanical connection in order to prevent the ends 262 from retreating through the respective openings or through-bores 265 in the mounts 263 of the seat back if the rod is bent during a crash. In the disclosed example, each end 262 of the rod 260 is threaded and retained beyond the exterior of its respective through-bore in the seat back by a conventional or other type of threaded nut 266. The nut can be preceded by a washer 268 if desired. Additionally, the nut can be a lock-type nut and/or incorporate a lock-type washer. The disclosed construction exceeds current requirements for crash safety standards.

The construction of the seat back 42 of the shell can be configured with formations in the plastic material in order to further enhance the strength of the portions of the seat back that retain the rod 260 and its ends 262. In the disclosed example, in the event of a crash, the seat shell 34 would be drawn forward relative to the support base 32, which might cause the recline rod 260 to bend rearward. In a conventional seat construction, the ends of the retainer bar are simply cosmetically covered by a plastic cap or merely cosmetically covered by molded plastic such as in a blind bore formation on the seat back. In the disclosed example, the ends 262 of the rod 260 are prevented from retreating back through their mounting openings or through-bores 265 in the seat back 42.

Figure 23A:
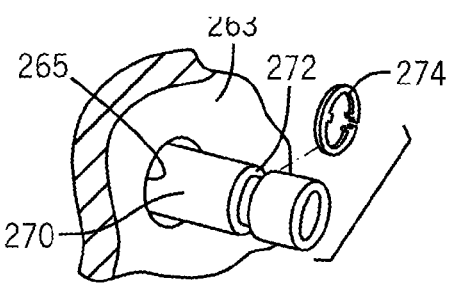
FIGS. 23A-23H show several different examples of alternative mechanical engagement devices for securing the rod of FIG. 22 to part of the car seat structure.
Figure 23B:
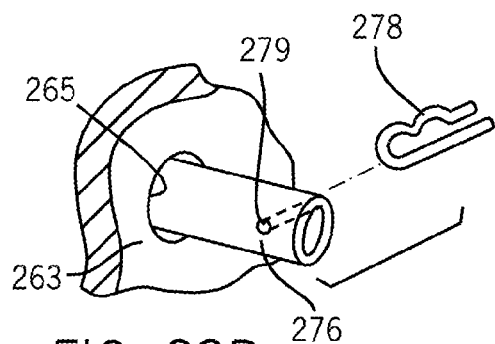
Figure 23C:
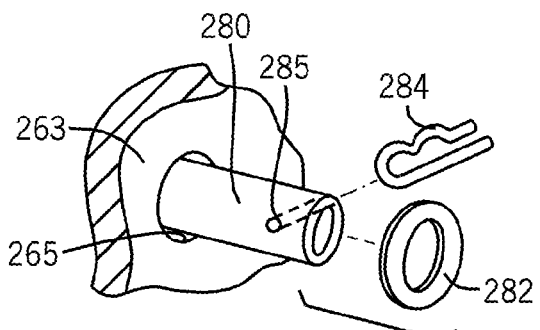
Figure 23D:
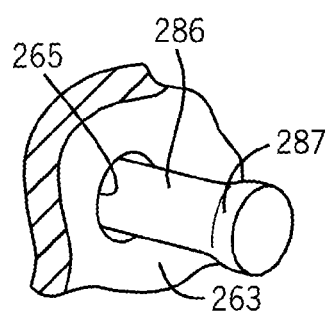
Figure 23E:
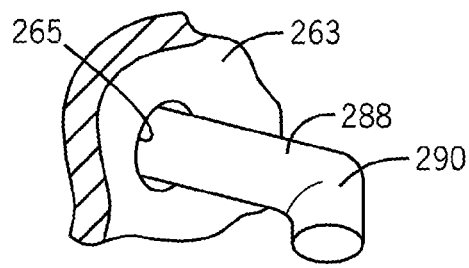
Figure 23F:
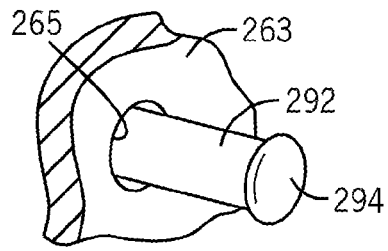
Figure 23G:
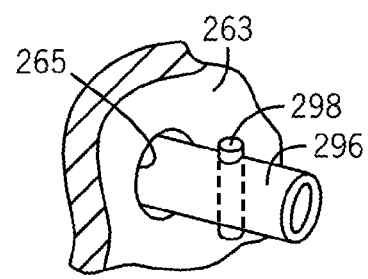
Figure 23H:
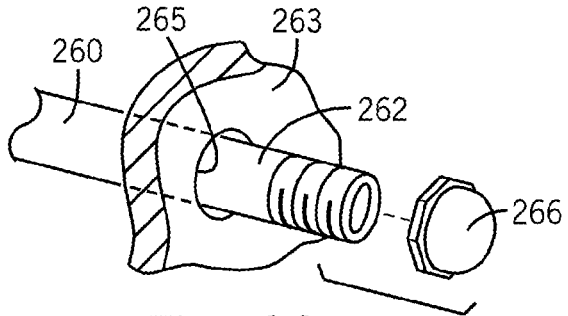

Other mechanical rod retention devices and arrangements can also be utilized, other than the disclosed threaded nut and washer construction. The intention is for the mechanical retainer to be robust and be of a size so that is at least in part larger than a diameter of the through-bores 265. FIGS. 23A-23H disclosed some alternative examples, and each depicts a generic mount 263 and through-bore 265 on one or the other of the back of the seat shell or front of the support base back section. FIG. 23A shows a rod end 270 with a groove 272 and a C-clip 274 received in the groove to mechanically retain the rod end. FIG. 23B shows a rod end 276 with a cotter pin 278 received through an opening 279 across or through the rod end 276 to mechanically retain the rod. FIG. 23C shows a rod end 280 mechanically retained by a washer 282 and a cotter pin 284 inserted into an opening 285 through the rod end. FIG. 23D shows a rod end 286 with a pinched, enlarged diameter portion 287 to mechanically retain the rod. FIG. 23E shows a rod end 288 with a bend 290 to mechanically retain the rod. FIG. 23F shows a rod end 292 with a spun or swaged, enlarged diameter tip 294 to mechanically retain the rod. FIG. 23G shows a rod end 296 with a VALCO button 298 to mechanically retain the rod. FIG. 23H shows a threaded rod end 262 of a rod 260 with a blind "acorn" nut 266 threaded to the end to mechanically retain the rod.

In each of the disclosed examples, the rod end has a feature that is larger than the rod diameter and larger than a diameter of the through-bore 265. The purpose is to prevent the rod end from easily fitting and retreating back through its bore in the seat back in the event of a relatively high pulse crash. Failure of the mechanical retention means, the rod, the seat back, or the material defining the rod bore in the seat back would have to occur in order for the seat shell to separate from the back section of the support base in each of the disclosed examples. Other methods to prevent the rod from bending and separating during a crash can include either using a stiffer and/or using a larger diameter recline rod stock material. Each disclosed example will likely offer differing results, but also offer different characteristics of use. Some may be more or less costly than others, more or less effective than others, more or less difficult to manufacture than others, and the like. Balancing the rod material, rod diameter, and mechanical attachment method, an optimal rod retention arrangement can be achieved for each car seat application.

Figure 24:
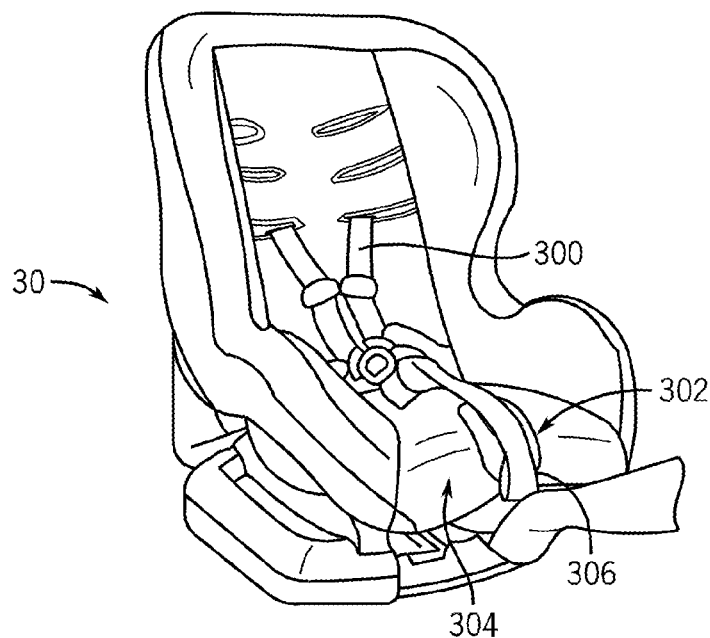
FIG. 24 is a perspective view showing a harness and a user actuating the recline feature of the car seat shown in FIG. 1.

FIG. 24 is a perspective view showing an occupant harness system 300 installed on the car seat assembly 30 depicted in FIG. 1. FIG. 24 also shows a user actuating the recline lever 242 and handle 250 to adjust the recline angle of the seat as depicted in FIG. 20. According to additional aspects of the present invention, the car seat 30 employs several features that render operating or actuating the recline lever 242 more comfortable, easier, and safer for the occupant of the seat.

As is known in the art, a harness system tensioning device or lock-and-release actuator 302 is typically positioned at a forward edge 304 of the seat bottom 40 of the seat shell 34. A tensioner strap 306 extends from the tensioning mechanism 302. By actuating the tensioner, the strap 306 can be pulled or withdrawn to tighten or loosen the harness system 300 for the comfort and safety of a seat occupant. As discussed above, a problem in the prior art is that when a user wishes to actuate a recline handle, the handle is typically positioned beneath and very near the tensioner mechanism. A user must rest either their thumb or their palm against the forward edge 304 of the seat bottom 40 in order to depress or pull up on the handle. By doing so, they often come in contact with the actuator button of the tensioner mechanism 30. This can result in the harness system 300 becoming inadvertently loose without the user realizing this has happened. As a result, the performance of the safety seat could be reduced.

Figure 25:
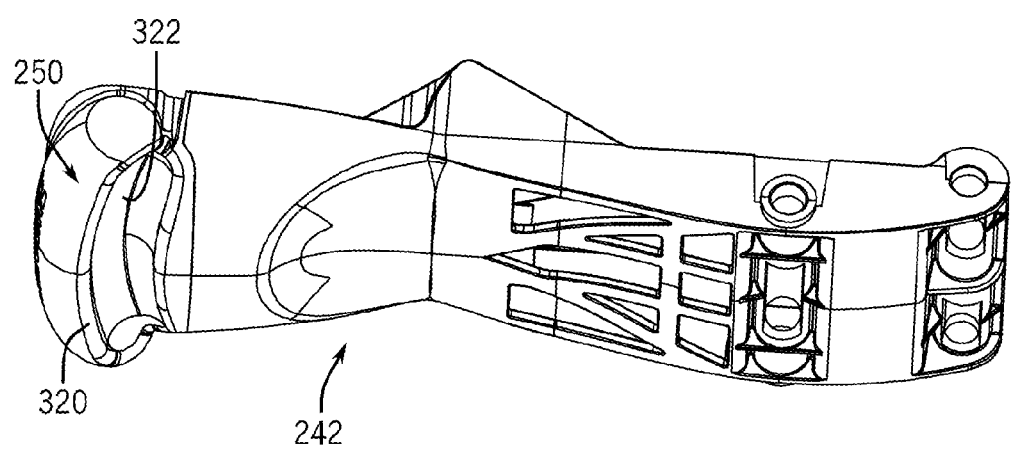
FIG. 25 is a perspective view of only the recline lever of the car seat shown in FIGS. 21 and 22.

In the disclosed example, the recline lever 242 is an elongate molded device as shown in FIG. 25. A handle end carries the handle 250, which projects forward a distance from the forward edge 304 of the seat bottom 40. To accommodate the extra forward projection of the handle 250, an integral plastic overhang such as a hood or shroud 308 is integrally molded and extends or projects forward from the forward edge 304 of the seat bottom 40. The hood or shroud 308 is configured and positioned to generally overlie the handle 250 in this example and to generally mimic the overall shape of the handle of the recline lever 242. In the disclosed example, as best depicted in FIG. 20, the handle 250 is spaced downward from the hood 308 in the latched, downward biased position. The overhang or shroud 308 can be a separately attached piece if desired.

As the user actuates the recline lever 242, the handle 250 is drawn upward toward the hood or shroud 308. In this example, the shroud is upwardly hollow creating a space into which a part of the handle can nest when actuated. A top surface 310 of the shroud 308 can be configured and positioned above the handle 250 to act as a leverage point or contact surface for a user's thumb or palm. This surface 110 is separate from the forward edge 304 of the seat bottom 40. By positioning both the handle 250 and the hood or shroud 308 forward of the seat edge 304, the user is much less inclined to place their palm or thumb on the tensioner device 302 when operating the handle. The top surface 310 thus will encourage a user to not touch or contact any part of the tensioner mechanism 302. When a user actuates the recline lever 242, the harness system 300 will not be inadvertently loosened while adjusting the recline angle of the seat. Additionally, the position and orientation of the top surface 310 of the shroud 308 can be optimized to provide an ergonomically suitable leverage point for actuation of the recline lever and handle without affecting the geometry of the seat. This will make it easier and more comfortable for a user to grasp and move the handle 250 in order to release the recline lever 242. This will also make it more comfortable for the user to hold the recline lever in a released position while readjusting the seat angle.

Figure 9:
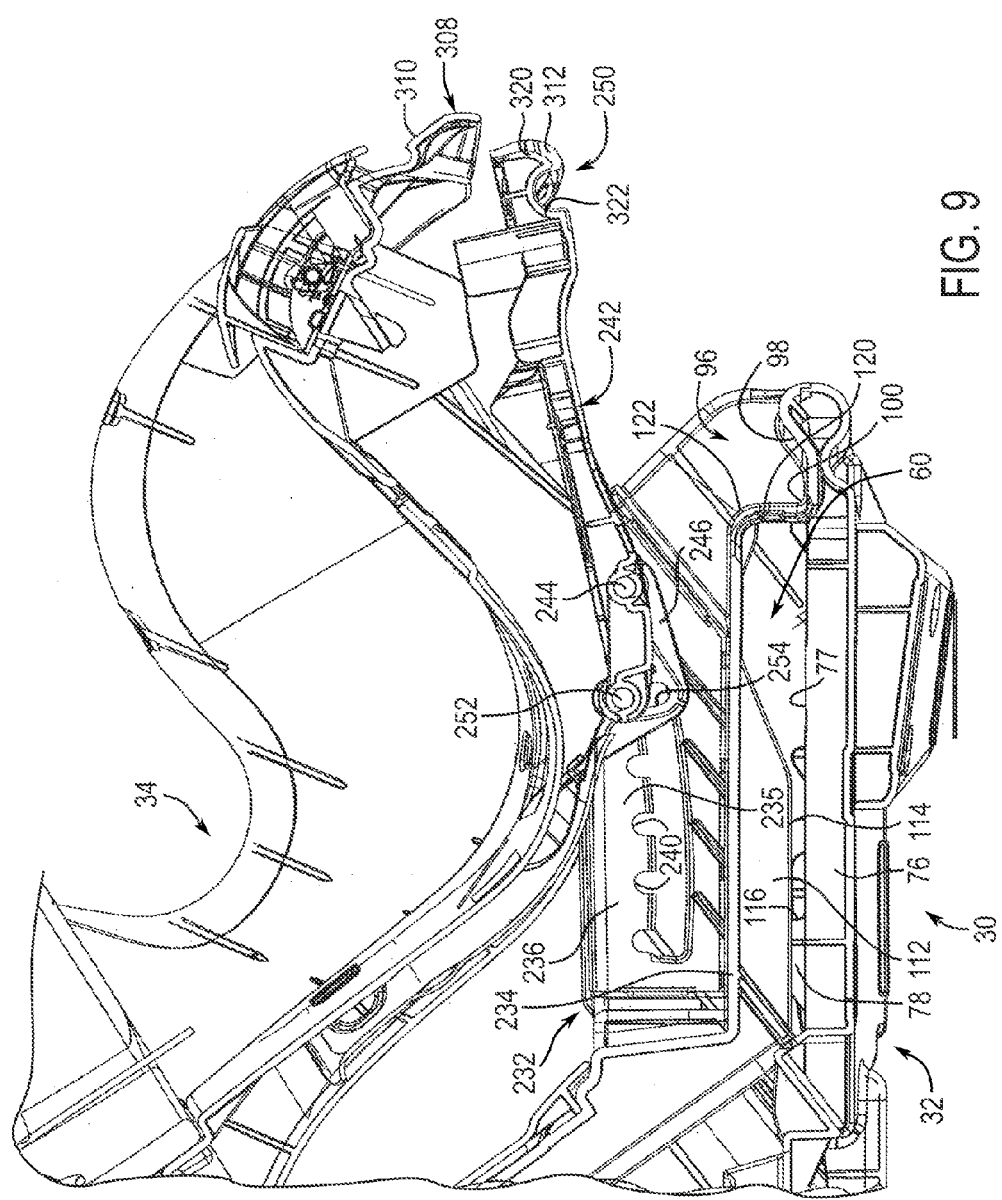
FIG. 9 is a cross section taken along line IX-IX of the car seat as shown in FIG. 1 and illustrates features of an instruction manual slot and recline handle constructed in accordance with the teachings of the present invention.

FIGS. 9 and 25 also illustrate in greater detail the handle 250. The construction of the handle 250 in the disclosed example provides improved ergonomics and comfort over prior known recline handles. In this example, the downward facing surfaces of the handle 250 all have smooth contours and curves and have no exposed edges. Thus, the user's hand will not come in contact with any sharp edges or ridges when grasping the handle 250 to operate the lever 242.

The handle surface is also covered by an exterior layer 312 of elastomeric or other softer, more resilient material when compared to the underlying plastic material of the lever 242 and handle 250. The resilient nature of the cover layer an also improve grip by compressing slightly at the pressure points when grasped. Grip enhancement can also be achieved by the nature of the surface coefficient of friction for the grip layer material selected. The material will most likely have a more tacky feel than the hard plastic, underlying lever and handle material. The material of the layer 312 will be more comfortable for a user to grasp. The layer 312 can be over-molded on all of the surfaces of the handle 250 part of the lever 242, if desired.

As shown in the cross section of FIG. 26, the forward portion of the handle has a bulbous or rounded downward facing portion 320. The bulbous portion 320 gradually and smoothly transitions into an upward extending finger recess 322 positioned behind the bulbous portion 320. All of the curves and surfaces of the downward facing parts of the handle in this example are smoothly and gradually curved and provide no exposed edges. All of the exposed plastic edges of the lever and handle structure are facing upward underneath the seat or the shroud 308. The elastomeric or other material layer 312 can be molded over or otherwise adhered to both the bulbous portion 320 and the finger recess 322 to achieve a highly comfortable and ergonomic grip surface on the handle 250. The disclosed lever and handle construction results in a recline handle that is easier to actuate, easier to grip, more comfortable to grip, and discourages a user from inadvertently or accidentally loosening the harness system 300 of the seat.

The contours of the handle surfaces, both on the lateral sides and the bottom facing side are rounded and smoothly transition to other parts of the handle. This reduces or eliminates sharp concentration points or contact points against a user's fingers or palm. The rounded contours of the handle surfaces also produce a relatively larger surface area that will be in contact with the user's hand during operation of the recline mechanism. This further eliminates load concentration points.

The resilient layer 312 can be over-molded during manufacture so as to chemically and mechanically bond to the handle surfaces. Alternatively, the layer 312 can be a separately molded cap added to the handle after its manufacture. Other suitable materials and manufacturing methods can also be used. For example, a spray-on rubber coating can be applied on the handle. A dip-coated layer could also be applied to the handle. The material durometer, surface characteristics, resiliency, and softness can be selected and adjusted to achieve desired feel and surface friction characteristics.

Although certain car seat features and functions have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A car seat comprising:
   a seat structure having a seating surface and a portion configured to rest on a dedicated seat of a vehicle when installed, the seat structure having a front and a pair of opposed sides;
   an instruction manual for the car seat; and
   a compartment configured to receive and retain the instruction manual, the compartment disposed interior to a part of the seat structure and having an access opening that is accessible when the car seat is installed,
   wherein the access opening has a pair of laterally extending slits on opposite sides of a larger sized central region.

2. A car seat according to claim 1, wherein the access opening is positioned on the front of the seat structure beneath the seating surface.

3. A car seat according to claim 1, wherein the access opening is positioned beneath the seating surface.

4. A car seat according to claim 1, wherein the access opening is in a front wall of the seat structure and a curved top end of the front wall curves rearwardly, and wherein the central region of the access opening extends upward to be partly within the curved top end of the front wall.

5. A car seat according to claim 1, wherein the compartment is configured to store the instruction manual in a horizontal orientation and has a bottom surface positioned below a level of at least part of the access opening.

6. A car seat according to claim 1, wherein the seat structure comprises:
   a support base configured to rest on the dedicated seat of the vehicle; and
   a seat shell defining the seating surface and supported on the support base, wherein the compartment is disposed within an interior of the support base.

7. A car seat according to claim 1, wherein the compartment has a bottom surface, a top surface spaced above the bottom surface, and a back end spaced rearward from the access opening, wherein the compartment is arranged to receive and store the instruction manual in a horizontal orientation, and wherein a spacing between the bottom surface and the top surface within the compartment becomes narrower from the access opening toward the back end.

8. A car seat according to claim 1, wherein the compartment has a bottom surface and has a finger recess positioned between the bottom surface and the access opening, the finger recess having a depth below a level of the bottom surface.

9. A car seat according to claim 1, wherein the seat structure includes a support base configured to rest on the dedicated seat of the vehicle and a seat shell defining the seating surface and supported on the support base, wherein the support base is formed of at least a bottom pan and a top piece sandwiched together, and wherein the compartment is integrally created within an interior of and sandwiched between the bottom pan and the top piece.

10. A car seat according to claim 1, wherein the compartment is formed integrally as a part of the seat structure.

11. A car seat according to claim 1, wherein the instruction manual lies horizontally when stored within the compartment and has a width, and wherein an opening width defined along the slits is larger than the width of the instruction manual and a central width of only the larger central region is smaller than the width of the instruction manual.

12. A car seat according to claim 1, wherein the compartment has a bottom surface on which the instruction manual lies, wherein the access opening is formed in a wall of the seat structure, and wherein the slits are positioned at an elevation higher than a level of the bottom surface such that parts of the wall beneath the slits extend above the level of the bottom surface.

13. A car seat according to claim 1, wherein the instruction manual has a width, and wherein an opening width defined along the slits is larger than the width of the instruction manual and a central width of only the larger central region is smaller than the width of the instruction manual.

14. A car seat according to claim 1, wherein the compartment has a bottom surface on which the instruction manual lies, wherein the access opening is formed in a wall of the seat structure, and wherein the slits are positioned at an elevation higher than a level of the bottom surface such that parts of the wall beneath the slits extend above the level of the bottom surface.

15. A car seat comprising:
   a support base formed of at least a bottom pan and a top piece connected to one another, the support base having a bottom section with a front and a pair of opposed sides and having a back section, the support base configured to rest on a dedicated seat of a vehicle;
   a seat shell defining a seating surface and being connected to and supported on the support base;
   an instruction manual for the car seat; and
   a compartment configured to receive and retain the instruction manual, the compartment disposed within an interior of the support base and having an access opening in the front of the support base accessible when the car seat is installed, wherein the compartment is created entirely by interrelation among integrally molded parts on the bottom pan and integrally molded parts on the top piece when assembled,
   wherein the access opening has a pair of laterally extending slits on opposite sides of a larger sized central region, wherein the compartment has a bottom surface, a top surface spaced above the bottom surface, and a back end spaced rearward from the access opening, wherein the compartment is arranged to receive and store the instruction manual in a horizontal orientation, and wherein a spacing between the bottom surface and the top surface within the compartment becomes narrower from the access opening toward the back end.

16. A car seat according to claim 15, wherein the access opening is positioned beneath the seating surface.

17. A car seat according to claim 15, wherein the access opening is in a front wall of the seat structure and a curved top end of the front wall curves rearwardly, and wherein the central region of the access opening extends upward to be partly within the curved top end of the front wall.

18. A car seat according to claim 15, wherein the compartment has a bottom surface positioned below a level of at least part of the access opening.

19. A car seat according to claim 15, wherein the compartment has a bottom surface and has a finger recess positioned between the bottom surface and the access opening, the finger recess having a depth below a level of the bottom surface.

20. A car seat comprising:
   a seat structure having a seating surface and a portion configured to rest on a dedicated seat of a vehicle when installed, the seat structure having a front and a pair of opposed sides;
   an instruction manual for the car seat;
   a compartment with a bottom surface configured to receive and retain the instruction manual, the compartment disposed interior to a part of the seat structure and having an access opening that is accessible when the car seat is installed; and
   a finger recess positioned between the bottom surface and the access opening, the finger recess having a depth below a level of the bottom surface, and
   wherein a spacing between the bottom surface and a top surface within the compartment becomes narrower from the access opening toward a back end.

21. A car seat according to claim 20, wherein the access opening is positioned on the front of the seat structure beneath the seating surface.

22. A car seat according to claim 20, wherein the access opening has a pair of laterally extending slits on opposite sides of a larger sized central region.

23. A car seat according to claim 22, wherein the compartment has a bottom surface on which the instruction manual lies horizontally on the bottom surface when stored within the compartment, wherein the access opening is formed in a wall of the seat structure, and wherein the slits are positioned at an elevation higher than a level of the bottom surface such that parts of the wall beneath the slits extend above the level of the bottom surface.

24. A car seat according to claim 20, wherein the compartment is configured to store the instruction manual in a horizontal orientation and has a bottom surface positioned below a level of at least part of the access opening.

25. A car seat according to claim 20, wherein the seat structure comprises:
   a support base forming the portion configured to rest on the dedicated seat of the vehicle; and
   a seat shell defining the seating surface and supported on the support base, wherein the compartment is disposed within an interior of the support base.

26. A car seat according to claim 20, wherein the top surface is spaced above the bottom surface, and the back end is spaced rearward from the access opening, wherein the compartment is arranged to receive and store the instruction manual in a horizontal orientation.

27. A car seat according to claim 20, wherein the compartment is formed integrally as a part of the seat structure.

* * * * *